(12) United States Patent
Okubo et al.

(10) Patent No.: US 7,299,680 B2
(45) Date of Patent: Nov. 27, 2007

(54) KNOCKING DETECTION

(75) Inventors: Katsura Okubo, Saitama (JP); Yuji Yasui, Saitama (JP); Masahiro Sato, Saitama (JP); Koichiro Shinozaki, Saitama (JP); Kosuke Higashitani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 57 days.

(21) Appl. No.: 11/268,729

(22) Filed: Nov. 8, 2005

(65) Prior Publication Data

US 2006/0086177 A1   Apr. 27, 2006

(30) Foreign Application Priority Data

Dec. 27, 2004  (JP) ............................. 2004-377218

(51) Int. Cl.
  G01L 23/22 (2006.01)
  F02P 5/00 (2006.01)
  G06F 19/00 (2006.01)

(52) U.S. Cl. ............................. 73/35.04; 123/406.42; 702/56

(58) Field of Classification Search ............ 73/35.03, 73/35.04, 35.06, 35.12; 123/414, 425, 479, 123/435
See application file for complete search history.

(56) References Cited

U.S. PATENT DOCUMENTS

| | | | | |
|---|---|---|---|---|
| 4,709,678 A | * | 12/1987 | Yagi et al. | ............. 123/406.42 |
| 4,750,103 A | * | 6/1988 | Abo et al. | ................... 701/111 |
| 4,856,480 A | * | 8/1989 | Nakajima et al. | ...... 123/406.35 |
| 4,962,738 A | * | 10/1990 | Iwata | ..................... 123/406.43 |
| 4,991,553 A | * | 2/1991 | Kurihara et al. | ....... 123/406.37 |
| 5,467,638 A | * | 11/1995 | Philipp | ...................... 73/35.06 |
| 5,483,936 A | * | 1/1996 | Kerstein et al. | ....... 123/406.16 |
| 6,805,099 B2 | * | 10/2004 | Malaczynski et al. | ...... 123/435 |
| 6,862,517 B2 | * | 3/2005 | Galtier | ...................... 701/111 |

FOREIGN PATENT DOCUMENTS

JP   2002-221074   8/2002

\* cited by examiner

*Primary Examiner*—Helen Kwok
(74) *Attorney, Agent, or Firm*—Arent Fox LLP

(57) ABSTRACT

An in-cylinder pressure sensor for outputting a signal corresponding to an internal cylinder pressure of an engine is provided. A first signal and a second signal are extracted from the output signal of the in-cylinder pressure sensor. The first signal has a frequency band corresponding to knocking of the engine. The second signal has a frequency band used for detecting a peak of the internal cylinder pressure. A knocking detection period is set based on the second signal. The first signal in the knocking detection period is examined to determine whether or not knocking has occurred.

16 Claims, 20 Drawing Sheets

(a) Signal (b) 1st-order Differential Signal (c) 2nd-order Differential Signal (a)

(b)

KNOCKING DETECTION

BACKGROUND OF THE INVENTION

The present invention relates to an apparatus and method for detecting knocking of an internal-combustion engine.

Conventionally, an occurrence of knocking is detected based on the output of a vibration sensor provided in an engine.

According to Japanese Patent Application Publication No. 2002-221074, a vibration sensor is provided in a cylinder of an engine. A wavelet transform is applied to the output of the vibration sensor to determine a vibration frequency characteristic. A combustion failure such as knocking or the like is detected by comparing the vibration frequency characteristic with a predetermined value.

Referring to FIG. 20(a), an example of the output of a vibration sensor provided in a cylinder of an engine is shown. The output of the vibration sensor varies due to an occurrence of knocking in regions 101 and 102. In regions 103 and 104, the output of the vibration sensor varies due to a noise generated when an intake/exhaust valve closes (referred to as a "seating noise"). Thus, the seating noise may be contained in the output of the vibration sensor. Such a seating noise may be erroneously determined as an occurrence of knocking.

FIG. 20(b) shows a waveform of a signal that is obtained by applying the wavelet transform to the output of the vibration sensor shown in FIG. 20(a) in accordance with the technique described in the above patent application publication. Frequency components corresponding to knocking (from 4.5 to 9 kHz) are extracted from the output of the vibration sensor by the wavelet transform. An impulse-like signal such as a seating noise has an influence on a wide range of frequencies. The influence of the seating noise appears in the signal obtained by the wavelet transform as shown in regions 105 and 106. Thus, even when the frequency components corresponding to knocking are extracted, there is still a possibility that an impulse-like noise such as a seating noise is erroneously determined as knocking.

In order to avoid such erroneous determination, a technique for setting a time period for detecting knocking for the output of the vibration sensor can be considered. However, if a longer detection period is set, an influence of various noises may appear in the detection period. If a shorter detection period is set, there is a possibility that knocking cannot be detected from the detection period when timing of knocking occurrence varies for some reason. For example, when sludge is built up in the engine, the timing of knocking occurrence may change. When a compression ratio of the engine changes, timing at which the pressure within a cylinder of the engine reaches the peak changes, which may displace the timing of knocking occurrence.

Thus, there is a need for an apparatus and a method that can locate an optimum period during which knocking occurs so as to detect the knocking more accurately.

SUMMARY OF THE INVENTION

According to one aspect of the present invention, an in-cylinder pressure sensor for outputting a signal corresponding to an internal cylinder pressure of an engine is provided. A first signal and a second signal are extracted from the output signal of the in-cylinder pressure sensor. The first signal has a frequency band corresponding to knocking of the engine. The second signal has a frequency band used for detecting a peak of the internal cylinder pressure. A knocking detection period is set based on the second signal. The first signal in the knocking detection period is examined to determine whether or not knocking has occurred.

Because the knocking detection period is optimally established in accordance with combustion conditions of the engine, knocking can be detected without being influenced by noise contained in the output of the in-cylinder pressure sensor.

According to one embodiment of the present invention, if a peak of the first signal exceeds a predetermined value in the knocking detection period, it is determined that knocking has occurred. Thus, because the period from which knocking is detected is limited, computational load for comparing the peak of the first signal with a predetermined value can be reduced. Alternatively, a value that is obtained by statistically processing the first signal may be used instead of the peak of the first signal.

According to one embodiment of the present invention, the output signal of the in-cylinder pressure sensor indicates a differential of the internal cylinder pressure of the engine. A value obtained by integrating the output of the in-cylinder pressure sensor may contain a drift and hence may overshoot due to the drift. If overshooting occurs, the accuracy of detecting knocking may deteriorate. By establishing the knocking detection period from the output signal of the in-cylinder pressure sensor, such deterioration can be avoided.

According to one embodiment of the present invention, the second signal has a frequency band in which an impulse signal appears when the internal cylinder pressure reaches the peak. The impulse signal indicates an occurrence of the peak of the internal cylinder pressure. The impulse signal is detected by comparing the second signal with a predetermined value. The knocking detection period is set over a predetermined period from a time at which the impulse signal is detected.

Thus, the peak of the internal cylinder pressure can be detected by using an impulse signal. The optimum knocking detection period corresponding to combustion conditions of the engine can be located with respect to the peak of the internal cylinder pressure. Even when a timing of knocking occurrence varies, the knocking can be more accurately detected in virtue of the optimum knocking detection period.

According to one embodiment of the present invention, the second signal has a frequency band that includes frequency components of the internal cylinder pressure. A second-order differential signal of the internal cylinder pressure is calculated based on the second signal. An occurrence of the peak of the internal cylinder pressure is detected by comparing the second-order differential signal with a predetermined value. A knocking detection period is set over a predetermined period from a time at which the peak of the internal cylinder pressure is detected.

Thus, the peak of the internal cylinder pressure can be detected from the second-order differential signal of the internal cylinder pressure. The optimum knocking detection period corresponding to combustion conditions of the engine can be established with respect to the peak of the internal cylinder pressure. Even when a timing of knocking occurrence varies, the knocking can be more accurately detected by virtue of the optimum knocking detection period.

According to another embodiment of the present invention, it is determined whether or not a detected crank angle signal for the engine is within a predetermined range. If the crank angle signal is within the predetermined range, the detection of the peak of the internal cylinder pressure is enabled. If the crank angle signal is not within the predetermined range, the detection of the peak is disabled.

Because the period during which the second signal is processed is limited based on the crank angle signal, it can be avoided that the knocking detection period is erroneously established due to noise contained in the second signal. In an embodiment where the second-order differential signal is calculated, if the crank angle signal is within a predetermined range, the detection of the peak is enabled. If the crank angle signal is not within the predetermined range, the detection of the peak is disabled.

DESCRIPTION OF THE PREFERRED
EMBODIMENTS

Figure 1:
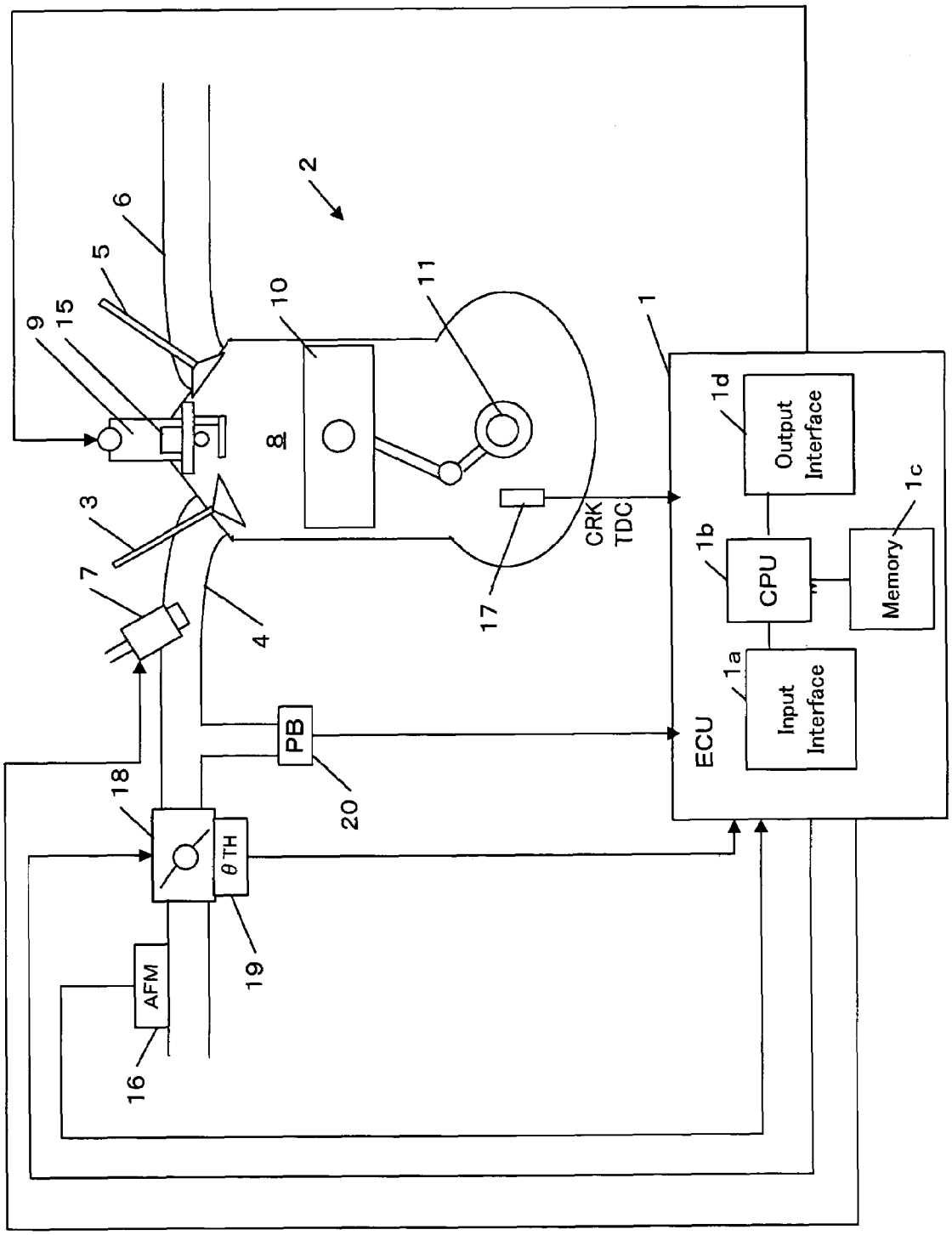
FIG. 1 is a block diagram of an engine and its control unit in accordance with one embodiment of the present invention.

Referring to the drawings, specific embodiments of the invention will be described. FIG. 1 is a block diagram showing an internal combustion engine (hereinafter referred to as an engine) and a control unit for the engine in accordance with one embodiment of the invention.

An electronic control unit (hereinafter referred to as an ECU) 1 is essentially a computer and comprises an input interface 1$a$ for receiving data sent from each part of the vehicle, a CPU 1$b$ for carrying out operation for controlling each part of the vehicle, a memory 1$c$ including a read only memory (ROM) and a random access memory (RAM), and an output interface 1$d$ for sending a control signal to each part of the vehicle. One or more programs and data for controlling each part of the vehicle are stored in the ROM. The ROM may be a rewritable ROM such as an EPROM. The RAM provides work areas for operation by the CPU 1$b$, in which data sent from each part of the vehicle as well as a control signal to be sent out to each part of the vehicle are temporarily stored.

An engine 2 is, for example, a 4-cycle engine. The engine 2 typically comprises a plurality of cylinders. For the purpose of simplicity, one of the cylinders is shown in the figure. The chamber 8 of the engine 2 is connected to an intake manifold 4 through an air intake valve 3 and connected to an exhaust manifold 6 through an exhaust valve 5. A fuel injection valve 7 for injecting fuel in accordance with a control signal from the ECU 1 is disposed in the intake manifold 4.

The engine 2 takes air-fuel mixture from the air taken from the intake manifold 4 and the fuel injected by the fuel injection valve 7 into the combustion chamber 8. A spark plug 9 is provided in the combustion chamber 8 to ignite a spark in accordance with an ignition timing signal from the ECU 1. The air-fuel mixture is burned by the spark. The combustion increases the volume of the mixture, which pushes the piston 10 down. The reciprocating motion of the piston 10 is converted into the rotation motion of the crankshaft 11.

An in-cylinder pressure sensor 15 is embedded in a portion, contacting with the cylinder, of the spark plug 9. The in-cylinder pressure sensor 15 generates a signal indicating a change rate of the pressure within the combustion chamber 8 (in-cylinder pressure). The signal is sent to the ECU 1.

A crank angle sensor 17 is disposed in the engine 2. The crank angle sensor 17 outputs a CRK signal and a TDC signal to the ECU 1 in accordance with the rotation of the crankshaft 11.

The CRK signal is a pulse signal that is output at every predetermined crank angle. The ECU 1 calculates a rotational speed NE of the engine 2 in accordance with the CRK signal. The TDC signal is also a pulse signal that is output at a crank angle associated with the TDC position of a piston 10.

A throttle valve 18 is disposed in the intake manifold 4 of the engine 2. An opening degree of the throttle valve 18 is controlled by a control signal from the ECU 1. A throttle valve opening sensor (θTH) 19, which is connected to the throttle valve 18, supplies the ECU 1 with a signal indicating the opening degree of the throttle valve 18.

An intake manifold pressure (Pb) sensor 20 is disposed downstream of the throttle valve 18. The intake manifold pressure Pb detected by the Pb sensor 20 is sent to the ECU 1.

An airflow meter (AFM) 16 is disposed upstream of the throttle valve 18. The airflow meter 16 detects the amount of air passing through the throttle valve 18. The detected amount of air is sent to the ECU 1.

A signal sent to the ECU 1 is passed to the input interface 1a. The input interface 1a converts an analog signal value into a digital signal value. The CPU 1b processes the resulting digital signal in accordance with a program stored in the memory 1c, and creates a control signal. The output interface 1d sends the control signal to actuators for the fuel injection valve 7, spark plug 9, throttle valve 18, and other mechanical components. The CPU 1b can detect knocking of the engine in accordance with one or more programs stored in the memory 1c.

Figure 2:
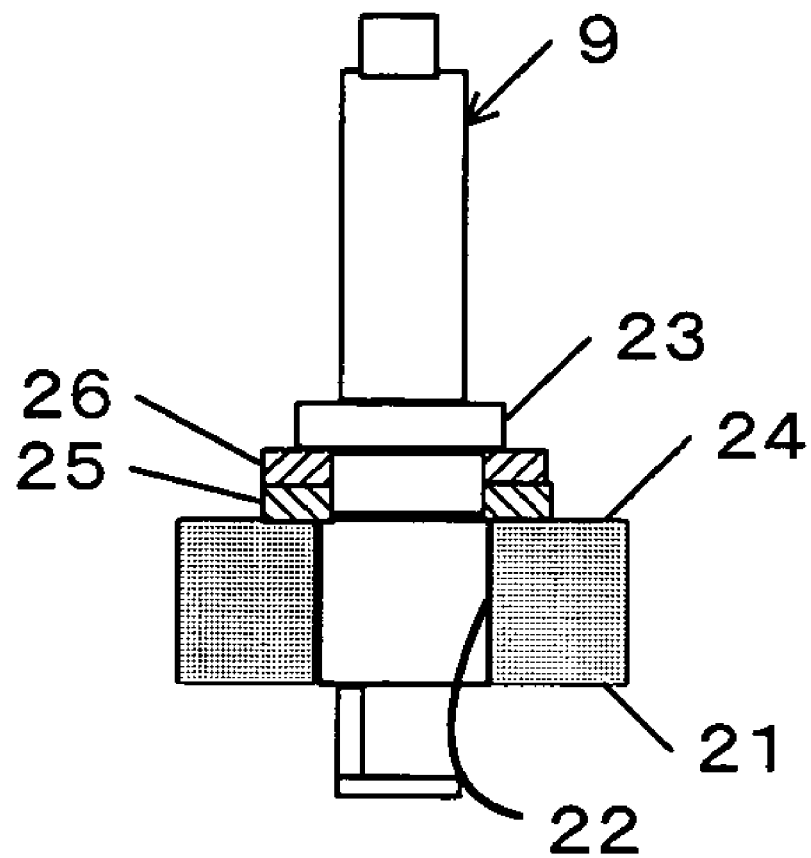
FIG. 2 schematically shows an in-cylinder pressure sensor in accordance with one embodiment of the present invention.

FIG. 2 shows an example of the in-cylinder pressure sensor 15. The spark plug 9 is screwed in a screw hole 22 of a cylinder head 21. A sensor element 25 of the in-cylinder pressure sensor and a washer 26 are sandwiched between a spark plug attaching surface 23 and a spark plug washer surface 24 of the cylinder head 21. The sensor element 25 is a piezo-electric element.

Because the sensor element 25 is tightened as a washer of the spark plug 9, the sensor element 25 is given a predetermined tightening load. When the pressure within the combustion chamber 8 changes, the load applied to the sensor element portion 25 changes. The in-cylinder pressure sensor 15 detects a change in the load relative to the predetermined tightening load as a change in the in-cylinder pressure.

Figure 3:
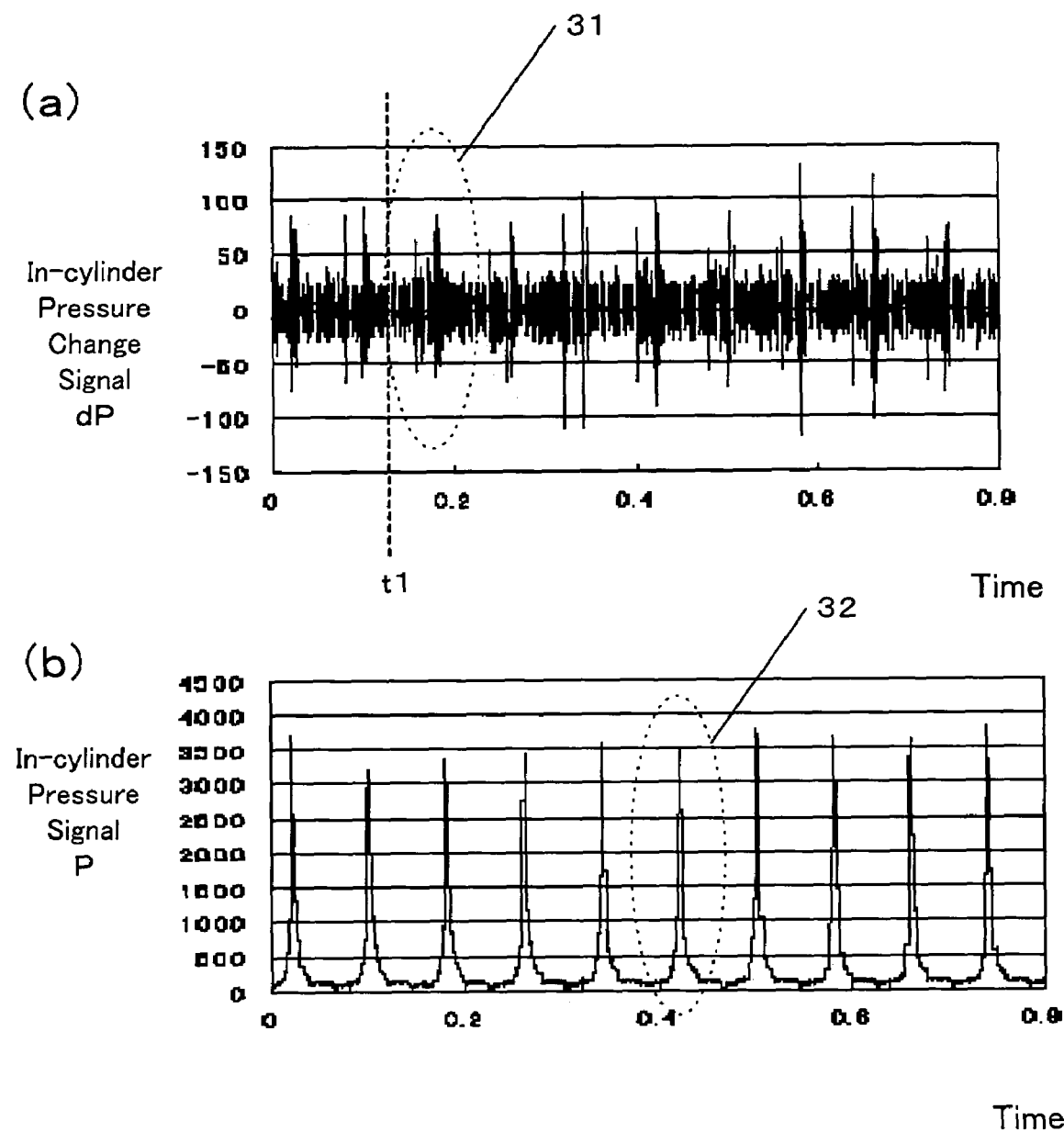
FIG. 3 schematically shows an in-cylinder pressure change signal and an in-cylinder pressure signal in accordance with one embodiment of the present invention.

FIG. 3(a) shows the output of the in-cylinder pressure sensor, that is, an in-cylinder pressure change signal dP indicating a change rate of the in-cylinder pressure. The output signal shown in FIG. 3(a) was obtained in a simulation performed under the following conditions:

A frequency Fs for sampling the output of the in-cylinder pressure sensor 36 kHz
A Nyquist frequency Fn: 18 kHz
An engine rotational speed NE : 1500 rpm
An engine load: low As shown in the equation (1), an in-cylinder pressure signal P indicating the in-cylinder pressure can be calculated by integrating the in-cylinder pressure change signal dP.

$$P = \int dP \quad (1)$$

FIG. 3(b) shows the in-cylinder pressure signal P thus calculated. In this simulation, knocking occurs around time t1. It is known that a knocking signal indicating knocking is introduced in the in-cylinder pressure change signal dP and the in-cylinder pressure signal P in response to the occurrence of knocking. A waveform containing such knocking signal is shown in regions 31 and 32.

The in-cylinder pressure has frequency components that are dependent on the engine rotational speed. Specifically, the frequency band of the in-cylinder pressure ranges from zero to k-th order frequency of the engine rotational speed (where k is equal to or greater than 2). As the engine rotational speed increases, the cycle length of the engine rotation is shorter, and hence the frequency band of the in-cylinder pressure is higher.

It was observed that the in-cylinder pressure ranges from zero to about 150 Hz in the above simulation where the engine rotational speed is 1500 rpm. The inventors performed similar simulations under different engine rotational speeds. As a result, it was recognized by the inventors that the in-cylinder pressure has a frequency band lower than about 1 kHz under possible engine rotational speeds.

On the other hand, knocking has particular frequency components that are dependent on the bore and stroke of the engine or the like. Knocking occurs around the peak of the in-cylinder pressure. It was observed from the above simulations that knocking has a frequency of about 8 kHz. For other engines, it was known that knocking has a frequency band greater than 6 kHz.

Thus, the frequency band of the in-cylinder pressure is lower than the frequency band of knocking. Therefore, the knocking signal can be extracted from the in-cylinder pressure change signal by analyzing the frequency of the in-cylinder pressure change signal.

Because frequency components of a sine wave (sin θ) and a cosine wave (cos θ) do not change through the integral as shown in the equations (2) and (3), the in-cylinder pressure change signal dP has the same frequency components as the in-cylinder pressure signal P.

$$\int (\sin \theta) = \cos \theta \quad (2)$$

$$\int (\cos \theta) = \sin \theta \quad (3)$$

Therefore, the in-cylinder pressure signal P can be used for the frequency analysis, instead of the signal dP. However, the in-cylinder pressure signal P obtained by the integral may contain a drift. Such a drift causes the calculated in-cylinder pressure signal P to overshoot. Therefore, it is preferable that the frequency analysis is applied to the in-cylinder pressure change signal dP.

Figure 4:
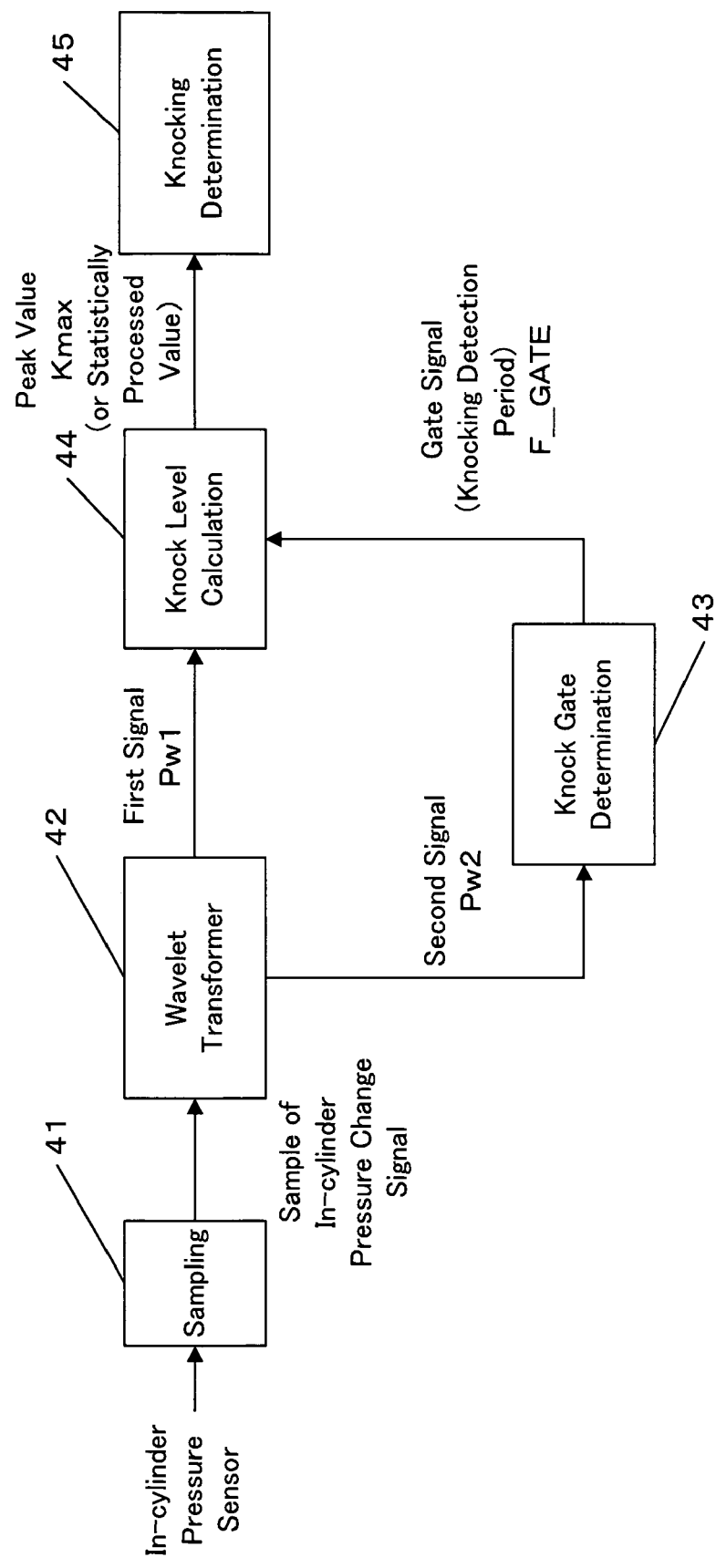
FIG. 4 is a block diagram of a knocking detecting apparatus in accordance with one embodiment of the present invention.

FIG. 4 is a block diagram of a knocking detecting apparatus in accordance with one embodiment of the present invention. The functions of the blocks in the figure can be typically implemented by ECU 1 (FIG. 1). For example, the functions can be implemented by one or more programs stored in the memory 1c of the ECU 1 (FIG. 1). Alternatively, these functions may be implemented by hardware.

A sampling device 41 samples the output of the in-cylinder pressure sensor 15 (FIG. 1) at a predetermined frequency to acquire a sample of the in-cylinder pressure change signal dP.

A wavelet transformer 42 performs the frequency analysis by using a discrete wavelet transform. Specifically, the wavelet transformer 42 receives samples of the in-cylinder pressure change signal dP from the sampling device 41. The wavelet transformer 42 applies the discrete wavelet transform to the samples of the in-cylinder pressure change signal dP to extract a first signal Pw1 having a frequency band corresponding to knocking and a second signal Pw2 having a frequency band to be used for detecting a peak of the in-cylinder pressure.

There is FFT (Fast Fourier transform) for frequency analysis. However, the FFT cannot recursively analyze the frequency. There is also Window Fourier Transform in which time is partitioned into small windows. However, such a transform is not appropriate to the recursive frequency analysis because it has the characteristics that the frequency resolution is coarser as the time resolution is higher.

Therefore, it is preferable that the discrete wavelet transform is used as in this embodiment. According to the discrete wavelet transform, the recursive frequency analysis can be effectively implemented. Alternatively, another appropriate scheme that can implement the recursive frequency analysis may be used.

A knock gate determining device 43 detects a peak of the in-cylinder pressure based on the second signal Pw2 in each combustion cycle. Based on the detected peak of the in-cylinder pressure, the knock gate determining device 43 sets a period in which knocking is to be detected. The period thus set will be hereinafter referred to as a "knocking detection period". A gate signal F_GATE shown in the figure is a signal indicating the knocking detection period. There are several embodiments for the knock gate determining device 43. These embodiments will be described later.

A knock level calculating device 44 examines the first signal Pw1 in the knocking detection period to determine a peak value Kmax of the first signal Pw1. A knocking determining device 45 compares the peak value Kmax of the first signal Pw1 with a predetermined value to determine whether or not knocking has occurred.

Instead of the peak value Kmax of the first signal Pw1, a value obtained by statistically processing the first signal Pw, for example, an average value of the first signal Pw, may be used. In this alternative case, the knocking determining device 45 determines whether or not knocking has occurred by comparing the statistically processed value with a predetermined value. The use of the statistically processed value can reduce erroneous determination which may be caused by noise.

Thus, because the knocking detection period is established in each combustion cycle based on the peak of the in-cylinder pressure, the knocking detection period is located optimally in accordance with the current combustion conditions of the engine. Therefore, even when the timing of knocking occurrence varies, the knocking can be detected more accurately.

Usually, the seating noise as described above occurs at a timing when an intake/exhaust valve closes. On the other hand, knocking occurs around the peak of the in-cylinder pressure. Because the timing of occurrence of the seating noise is different from the timing of knocking occurrence, it can be avoided that the seating noise is contained in the knocking detection period as long as the knocking detection period is established appropriately in accordance with combustion conditions of the engine. Thus, an erroneous determination that the seating noise is regarded as knocking can be avoided.

Figure 5:
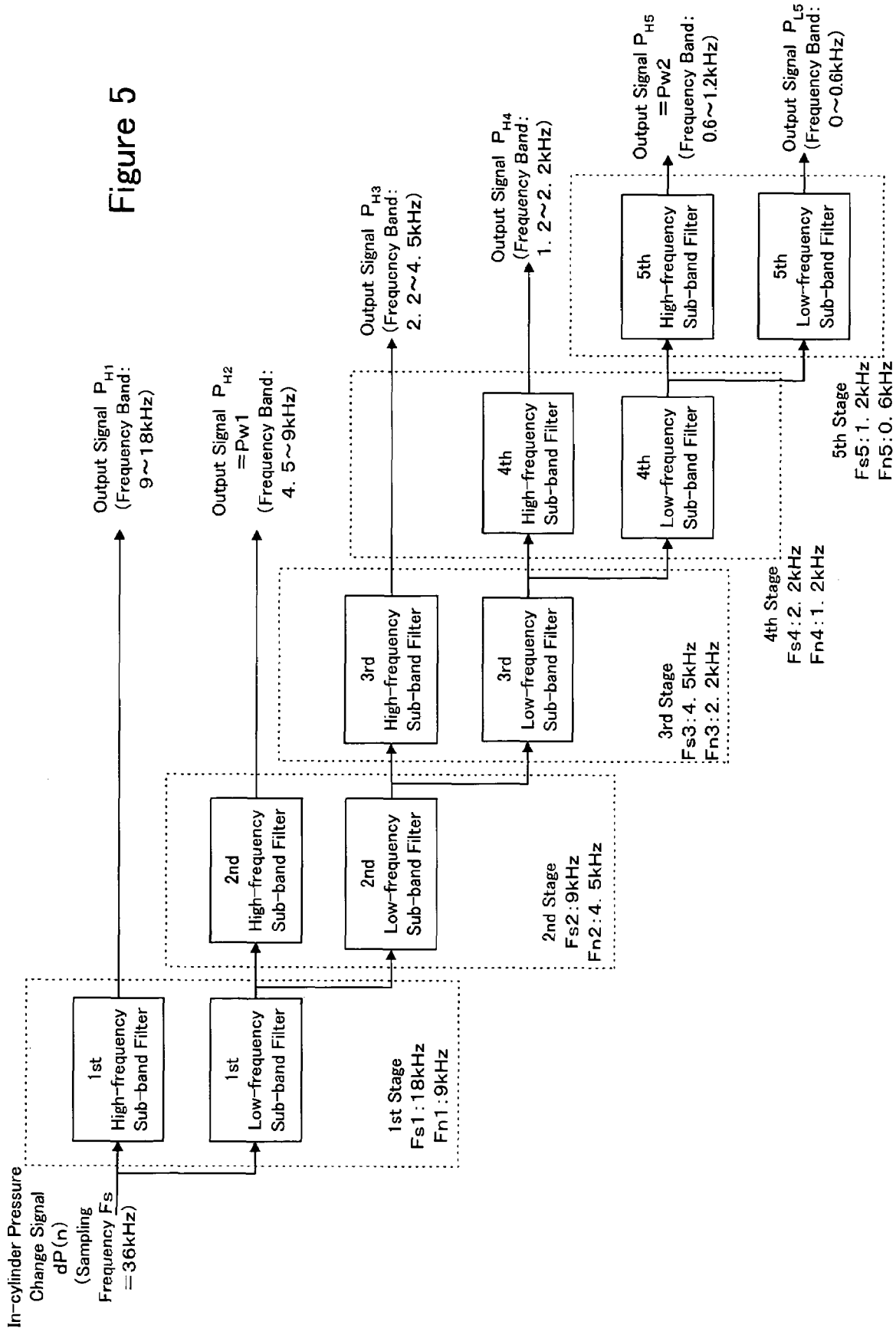
FIG. 5 is a block diagram of a wavelet transformer in accordance with one embodiment of the present invention.

FIG. 5 is a detailed block diagram of the wavelet transformer 42. The number of stages of the wavelet transformer 42 is five. In each stage, a high-frequency sub-band filter and a low-frequency sub-band filter are provided.

It should be noted that the number of the stages of the wavelet transformer is set in accordance with the frequency Fs that is used for sampling the output of the in-cylinder pressure sensor. This is because the sampling frequency Fs of the in-cylinder pressure change signal dP is subdivided by the high-frequency sub-band filter and the low-frequency sub-band filter in each stage. As described above, the first signal Pw1 has a frequency band corresponding to knocking and the second signal Pw2 has a frequency band to be used for detecting a peak of the in-cylinder pressure. Therefore, the wavelet transformer is configured to have the number of stages required for extracting these frequency bands. FIG. 5 shows a case when the sampling frequency Fs is 36 kHz, as an example.

Further, the number of the stages of the wavelet transformer 42 also depends on which of the embodiments described later is selected to implement the knock gate determining device 43. This is because the frequency band to be used for detecting a peak of the in-cylinder pressure changes depending on which embodiment is used to implement the knock gate determining device 43. FIG. 5 shows the wavelet transformer 42 when the knock gate determining device 43 in accordance with a first or second embodiment is used.

The wavelet transformer 42 receives a sample dP(n) of the in-cylinder pressure change signal acquired by the sampling device 41. "n" indicates a sampling time. The sample of the in-cylinder pressure change signal is acquired at the frequency of Fs.

The first high-frequency sub-band filter generates an output signal $P_{H1}$ in accordance with the equation (4). A downward arrow in the equation (4) represents a down-sampling. The output signal $P_{H1}$ is generated at a frequency of (Fs/2).

$$P_{H1}(n) = \{(dP(n) - dP(n-1))/2\} \downarrow \qquad (4)$$

Figure 6:
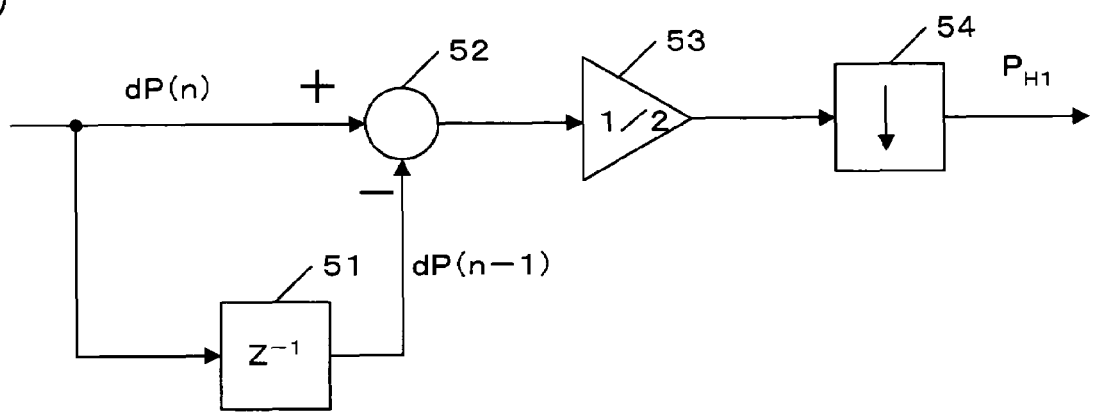
FIG. 6(a) is a block diagram of a high-frequency sub-band filter.
FIG. 6(b) is a block diagram of a low-frequency sub-band filter, in accordance with one embodiment of the present invention.
Figure 6:
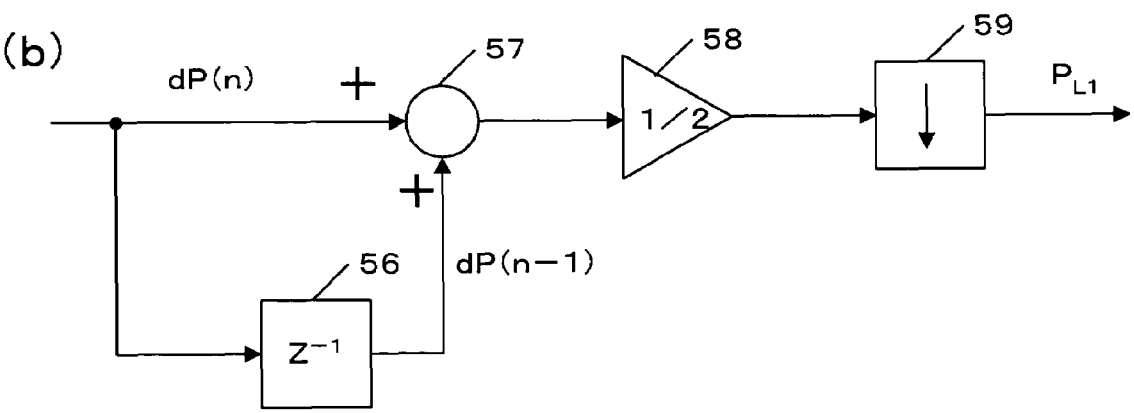

The equation (4) performed by the first high-frequency sub-band filter can be expressed by a block diagram shown in FIG. 6(a). A subtracter 52 calculates a difference between the current value dP(n) and the previous value dP(n−1) of the in-cylinder pressure change signal. Here, the previous signal is a signal delayed by a delay element 51. An output of the subtracter 52 is multiplied by ½ in an amplifier 53. An output from the amplifier 53 is down-sampled by a down-sampling circuit 54. Alternatively, the amplifier 53 may use another value other than ½.

In this example, because the sampling frequency Fs is 36 kHz, the frequency Fs1 of the output signal $P_{H1}$ of the first high-frequency sub-band filter is 18 kHz. The Nyquist frequency Fn1 is 9 kHz. The first high-frequency sub-band filter extracts a high frequency sub-band signal from the 0-18 kHz frequency band, that is, extracts a signal having the frequency of 9-18 kHz.

The second to fifth high-frequency sub-band filters have a configuration and functions similar to the first high-frequency sub-band filter. Each high-frequency sub-band filter outputs a signal having the higher-frequency half of the input signal's frequency band.

The first low-frequency sub-band filter generates an output signal $P_{L1}$ in accordance with the equation (5). A downward arrow in the equation (5) represents a down-sampling. The output signal $P_{L1}$ is generated at a frequency of (Fs/2).

$$P_{L1}(n) = \{(dP(n) + dP(n-1))/2\} \downarrow \qquad (5)$$

The equation (5) performed by the first low-frequency sub-band filter can be expressed by a block diagram shown in FIG. 6(b). An adder 57 calculates a sum of the current value dP(n) and the previous value dP(n−1) of the in-cylinder pressure change signal. Here, the previous signal is a signal delayed by a delay element 56. An output of the adder 57 is multiplied by ½ in an amplifier 58. An output from the amplifier 58 is down-sampled by a down-sampling circuit 59. Alternatively, the amplifier 58 may use another value other than ½.

In this example, because the sampling frequency Fs is 36 kHz, the frequency Fs1 of the output signal $P_{L1}$ of the first low-frequency sub-band filter is 18 kHz. The Nyquist frequency Fn1 is 9 kHz. The first low-frequency sub-band filter extracts a low frequency sub-band signal from the 0-18 kHz frequency band, that is, extracts a signal having the frequency of 0-9 kHz.

The second to fifth low-frequency sub-band filters have a configuration and functions similar to the first low-frequency sub-band filter. Each low-frequency sub-band filter outputs a signal having the lower-frequency half of the input signal's frequency band.

As described above, a knocking signal appears in a predetermined frequency band depending on the engine rotational speed. In the above simulation, the frequency of the knocking signal is about 8 kHz, which is contained in the frequency band (4.5 to 9 kHz) of the output signal of the second high-frequency sub-band filter. Accordingly, the knocking signal can be extracted from the output signal $P_{H2}$ of the second high-frequency sub-band filter. The output signal $P_{H2}$ of the second high-frequency sub-band filter is used as the first signal Pw1.

As described above, the in-cylinder pressure has frequency components that are dependent on the engine rotational speed. In the above simulation where the engine rotational speed is 1500 rpm, the frequency band of the in-cylinder pressure is 0 to about 150 Hz, which is contained in the frequency band (0 to 600 Hz) of the output signal $P_{L5}$ of the fifth low-frequency sub-band filter. Accordingly, the frequency band of the output signal $P_{L5}$ of the fifth low-frequency sub-band filter is used as a frequency band of an in-cylinder pressure signal containing no knocking signal.

Alternatively, because the frequency band of the in-cylinder pressure is zero to about 150 Hz when the engine rotational speed is 1500 rpm, a sixth low-frequency sub-band filter can be provided to extract the in-cylinder pressure signal from the output of the sixth low-frequency sub-band filter. However, considering a high frequency noise, it is preferable that a 600 Hz wide frequency band be used. Further, if the sixth low-frequency sub-band filter is provided, the computational load increases because the number of stages of the wavelet transform increases. Further, the frequency band of the in-cylinder pressure becomes higher with an increase in the engine rotational speed. The frequency band of zero to 600 Hz can be still used for extracting the in-cylinder pressure signal under a higher engine rotational speed (for example, 6000 rpm). Therefore, in this embodiment, the frequency band (zero to about 600 Hz) of the output signal $P_{L5}$ from the fifth low-frequency sub-band filter is used as a frequency band of the in-cylinder pressure.

As described above, the second signal Pw2 is a signal used for detecting a peak of the in-cylinder pressure. The knock gate determining device 43 in accordance with the first and second embodiments detects a peak of the in-cylinder pressure by using an impulse signal that occurs when the in-cylinder pressure reaches the peak. The impulse signal can be extracted from the output signal $P_{H5}$ of the fifth high-frequency sub-band filter (the reason for this will be described later). Therefore, the output signal $P_{H5}$ of the fifth high-frequency sub-band filter is used as the second signal Pw2.

Figure 7:
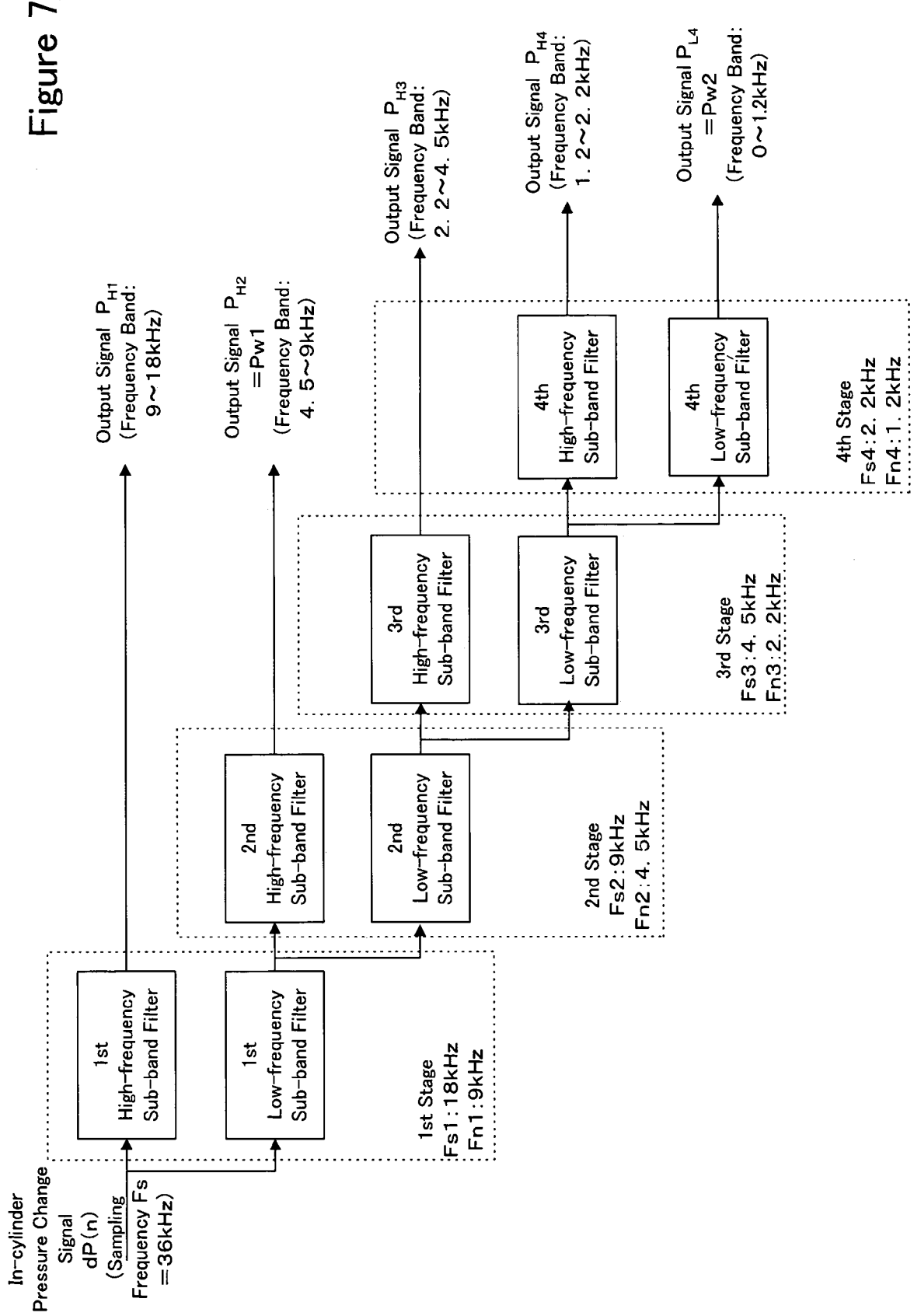
FIG. 7 is a block diagram of a wavelet transformer in accordance with another embodiment of the present invention.

FIG. 7 is a block diagram of the wavelet transformer 42 when the knock gate determining device 43 in accordance with the below-described third and fourth embodiments is used. A difference from the wavelet transformer 42 of FIG. 5 is in the number of stages. The configuration and functions of the high-frequency sub-band filters and the low-frequency sub-band filters are same. Using the output signal $P_{H2}$ of the second high-frequency sub-band filter as the first signal Pw1 is also same. The number of stages in this embodiment is four because the sampling frequency Fs of the in-cylinder pressure change signal dP is 36 kHz. It should be noted that the number of stages changes depending on the sampling frequency as described above.

The knock gate determining device 43 in accordance with the third and fourth embodiments determines a peak of the in-cylinder pressure based on the second-order differential signal of the in-cylinder pressure. The second-order differential signal of the in-cylinder pressure can be calculated from the output signal $P_{L4}$ of the fourth low-frequency sub-band filter (the reason for this will be described later). Therefore, the output signal $P_{L4}$ of the fourth low-frequency sub-band filter is used as the second signal Pw2.

Figure 8:
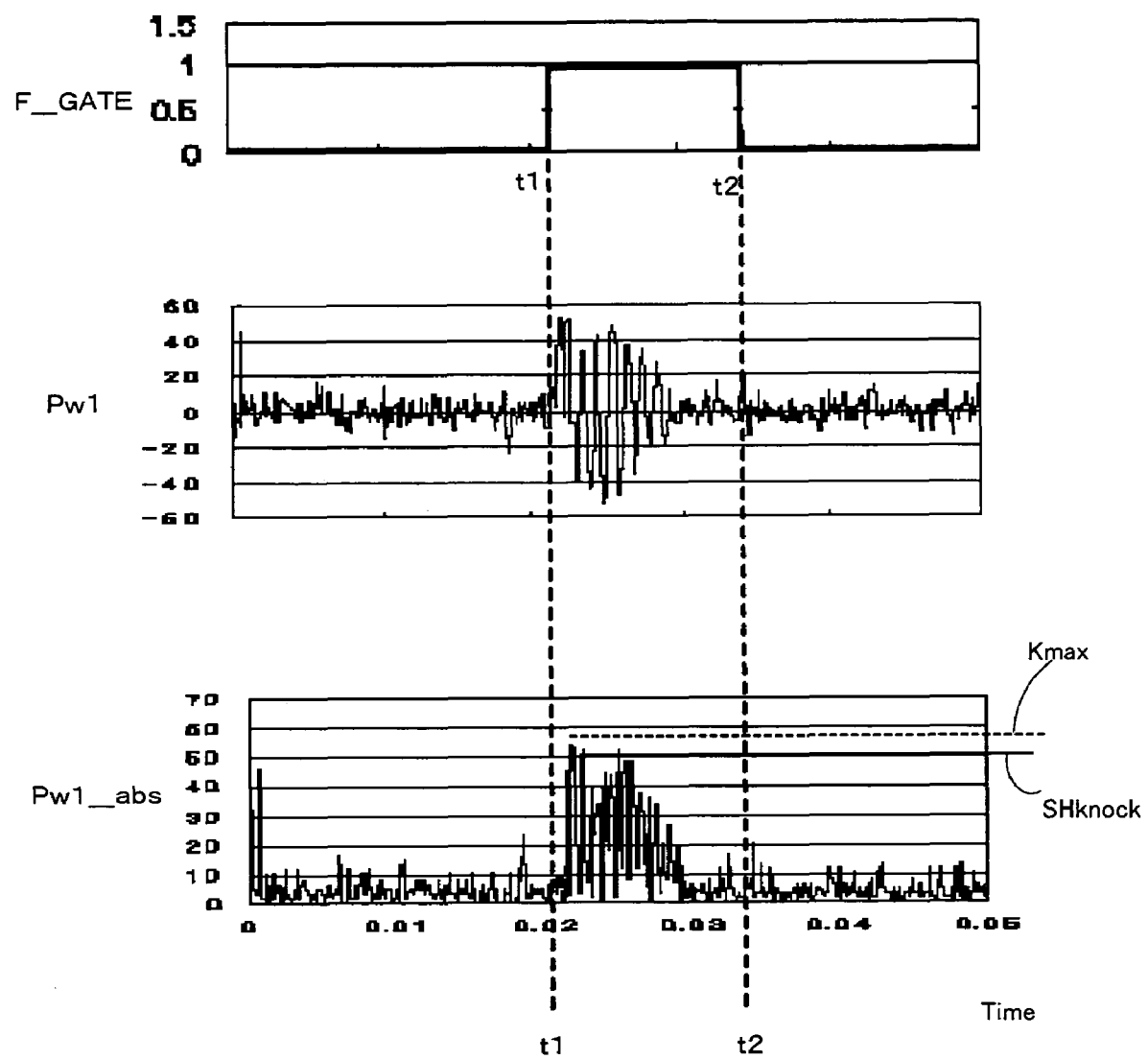
FIG. 8 shows how to detect a knocking occurrence in accordance with one embodiment of the present invention.

Referring to FIG. 8, operation of the knock level calculating device 44 and the knock level determining device 45 will be described in detail.

A gate signal F_GATE that is output from the knock gate determining device 43 is a signal indicating the knocking detection period. The gate signal F_GATE is kept at a high level during time t1 to t2. This time period from t1 to t2 is the knocking detection period.

The knock level calculating device 44 calculates an absolute value Pw1_abs of the first signal Pw1, as shown in the equation (6), every time the first signal Pw1 is obtained in the knocking detection period. ABS in the equation (6) indicates a function for returning the absolute value. The knock level calculating device 44 determines a peak value Kmax of the absolute value Pw1_abs of the first signal in the knocking detection period as shown in the equation (7). The absolute value Pw1_abs and peak value Kmax are shown in FIG. 8.

$$Pw1\_abs \Leftarrow ABS(Pw1) \qquad (6)$$

$$K\max \Leftarrow \text{peak value of } Pw1\_abs \qquad (7)$$

The knocking determining device 45 compares the peak value Kmax with a predetermined value SHknock. If the peak value Kmax is equal to or greater than the predetermined value SHknock, it indicates that a knocking signal is contained in the output of the in-cylinder pressure sensor. As shown in the equation (8), if the peak value Kmax is equal to or greater than the predetermined value SHknock, the knocking determining device 45 determines that knocking has occurred. If the peak value Kmax is less than the predetermined value SHknock, the knocking determining device 45 determines that knocking has not occurred.

$$K\max \geq SHknock: \text{knocking has occurred}$$

$$K\max < SHknock: \text{knocking has not occurred} \qquad (8)$$

In the example shown in FIG. 8, because the peak value Kmax having a value equal to or greater than the predetermined value SHknock is detected in the knocking detection period t1 to t2, the knocking determining device 45 determines that knocking has occurred.

As described above, instead of the peak value Kmax, a value obtained by statistically processing the first signal Pw, for example, the average or integral of the first signal, may be used. The equations (9) and (10) are used for calculating the average Kabe and the integral Kint of the first signal, respectively. "n" indicates the number of times for sampling the first signal in the knocking detection period in one combustion cycle. In this case, if the average Kabe or the integral Kint is less than the predetermined value SHknock, it is determined that knocking has not occurred.

$$Kabe = \frac{Pw1\_abs(1) + \ldots + Pw1\_abs(n-1) + Pw1\_abs(n)}{n} \quad (9)$$

$$Kint = \sum_{1}^{n} (Pw1\_abs(k)) \quad (10)$$

Referring to a first to fourth embodiments, the knock gate determining device 43 will be described.

First Embodiment of Knock gate Determining Device

Figure 9:
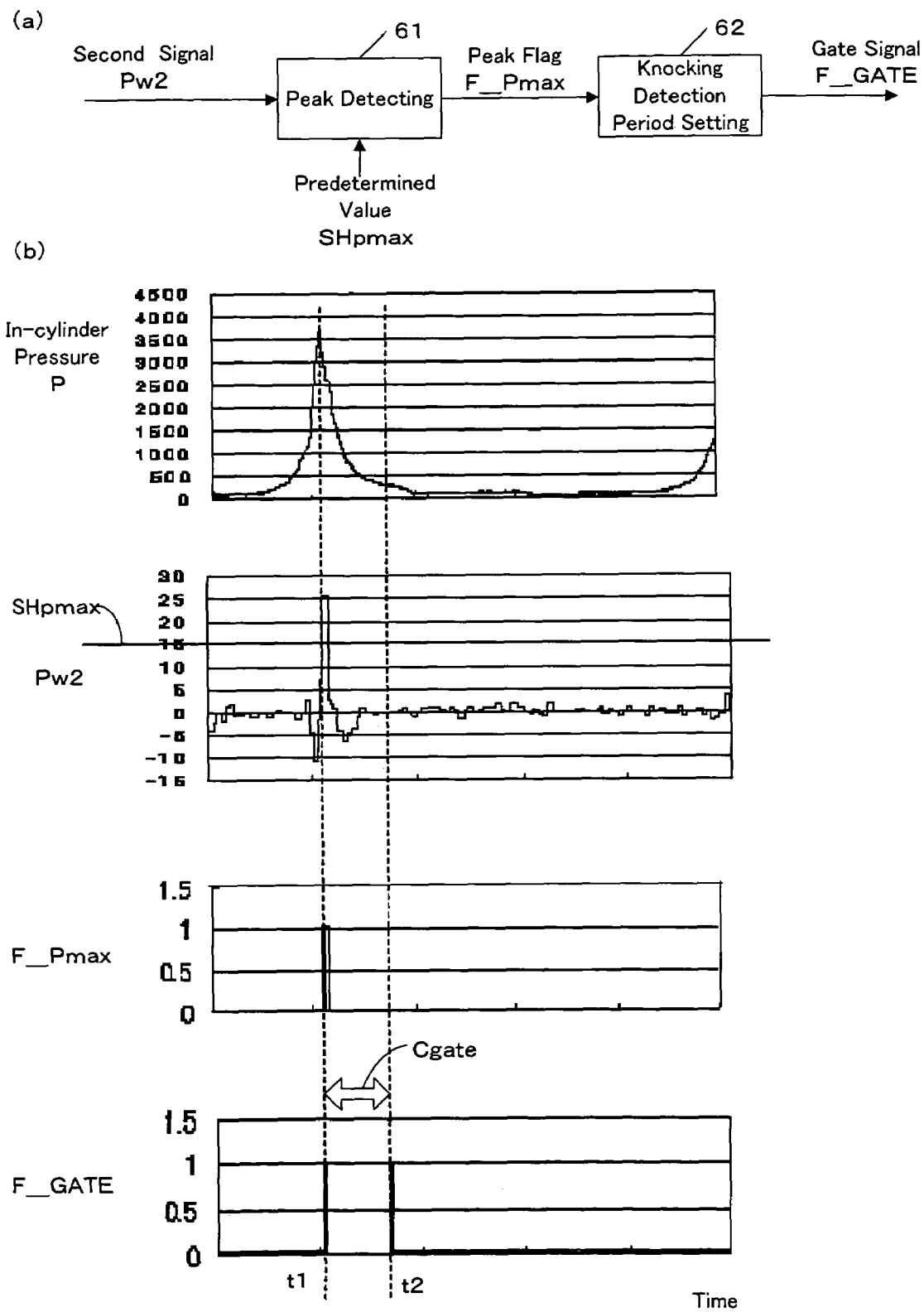
FIG. 9 is a block diagram of a knocking detection period setting device and shows how to set a knocking detection period in accordance with a first embodiment of the present invention.

FIG. 9(a) is a block diagram of the knock gate determining device 43 in accordance with the first embodiment. An in-cylinder pressure peak detecting device 61 receives the output signal of the fifth high-frequency sub-band filter of the wavelet transformer 42 as the second signal Pw2. As shown in FIG. 5, the frequency band of the second signal Pw2 is 0.6 to 1.2 kHz. The peak of the in-cylinder pressure is detected from the second signal Pw2.

The reason that the peak of the in-cylinder pressure can be detected from the second signal Pw2 will be described. Because there is a steep change in the peak of the in-cylinder pressure, the peak of the in-cylinder pressure has a wide range of frequency components. In order to effectively extract the peak of the in-cylinder pressure without being influenced by the knocking signal and the in-cylinder pressure signal, it is preferable that a frequency band different from both the frequency band of the knocking signal and the frequency band of the internal cylinder pressure signal is selected.

More specifically, the knocking frequency is about 8 kHz in this embodiment. The second or higher order frequency of knocking may be contained in the in-cylinder pressure change signal. Therefore, the frequency band equal to or higher than 8 kHz is not selected. A frequency band that is lower than the frequency band of the knocking and is different from the frequency band (0 to 600 Hz) of the in-cylinder pressure is selected. Thus, in this embodiment, a frequency band 600 Hz to 1.2 kHz of the output signal $P_{H5}$ of the fifth high-frequency sub-band filter is selected. The output signal $P_{H5}$ is used as the second signal Pw2.

Alternatively, because the output signal $P_{H4}$ of the fourth high-frequency sub-band filter and the output signal $P_{L4}$ of the fourth low-frequency sub-band filter have a frequency band that is lower than the frequency band of knocking and is different from the frequency band of the in-cylinder pressure, one of these signals may be used as the second signal Pw2.

As shown in the equation (11), the in-cylinder pressure peak detecting device 61 compares the second signal Pw2 with a predetermined value SHpmax every time the second signal Pw2 is obtained. If the second signal Pw2 having a value equal to or greater than the predetermined value SHpmax is obtained, the peak detecting device 61 determines that the peak of the in-cylinder pressure has been detected. A value of 1 is set in a peak flag F_Pmax. If the second signal Pw2 having a value equal to or greater than the predetermined value SHpmax does not appear, the value of the peak flag F_Pmax is kept at zero.

Pw2≧SHP max⇒F_P max=1

Pw2<SHP max⇒F_P max=0 (11)

A knocking detection period setting device 62 sets a gate signal F_GATE to a value of 1 in response to setting the peak flag F_Pmax to a value of 1 and then starts measuring a time period Cgate. During the time period Cgate, the gate signal F_GATE is kept at the value of 1. The time period during which the gate signal F_GATE is kept at the value of 1 is the knocking detection period.

Referring to FIG. 9(b), operation of the knock gate determining device in accordance with the first embodiment will be specifically described. It should be noted that the in-cylinder pressure signal P is not actually used by the knock gate determining device 43. The in-cylinder pressure signal is shown in the figure for the purpose of indicating a time at which the peak of the in-cylinder pressure occurs.

It is seen that an impulse signal appears in the second signal Pw2 in response to the peak of the in-cylinder pressure at time t1. Because the second signal Pw2 having a value equal to or greater than the predetermined value SHpmax is obtained at t1, a value of 1 is set in the peak flag F_Pmax. In response to setting the value of 1 in the peak flag F_Pmax, the gate signal F_GATE is kept at a value of 1 during the time period Cgate (t1 to t2).

Thus, because the knocking detection period is established based on the peak of the in-cylinder pressure, it can be avoided that the seating noise is included in the knocking detection period. The knocking detection period can be set in each combustion cycle in accordance with combustion conditions of the engine. Even when timing of knocking occurrence varies, the knocking can be more accurately detected because the knocking detection period is appropriately established.

Second Embodiment of Knock Gate Determining Device

As described above, the impulse signal has various frequency components. The seating noise occurs discontinuously and hence may cause such an impulse signal. If the seating noise is introduced in the second signal Pw2, the knocking detection period may be erroneously established due to the impulse signal caused by the seating noise. This may lead to reducing the accuracy of knocking detection. The knock gate determining device 43 in accordance with the second embodiment avoids such erroneous establishment of the knocking detection period.

Figure 10:
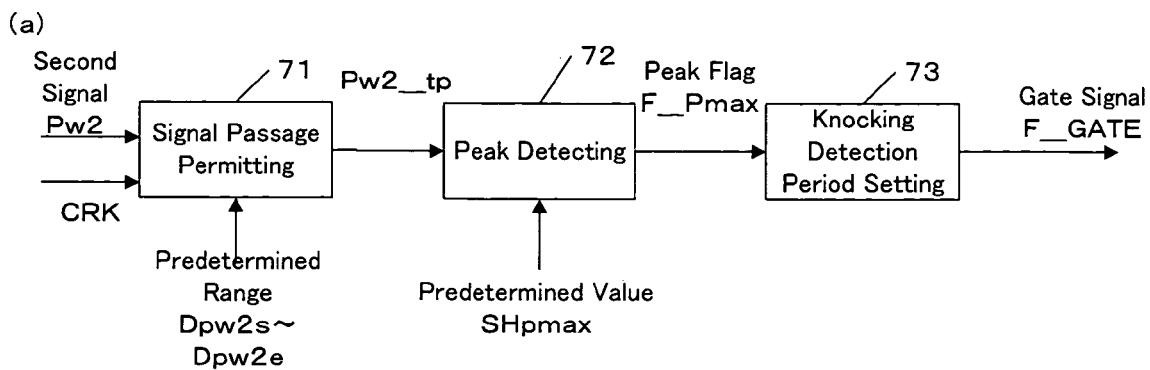
FIG. 10 is a block diagram of a knocking detection period setting device and shows how to set a knocking detection period in accordance with a second embodiment of the present invention.
Figure 10:
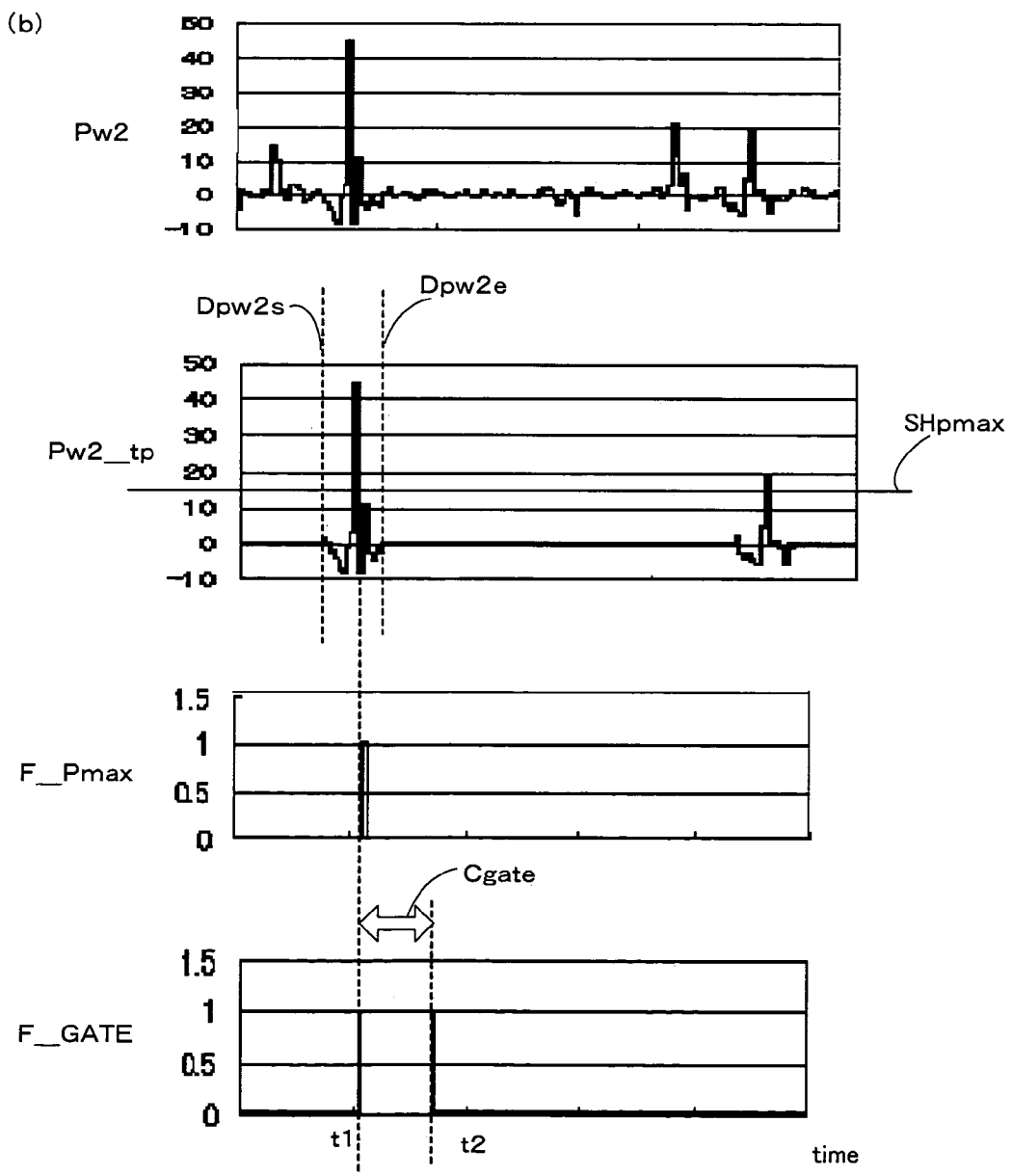

FIG. 10(a) is a block diagram of the knock gate determining device 43 in accordance with the second embodiment. A difference from the first embodiment is in that a signal passage permitting device 71 is provided upstream of an in-cylinder pressure peak detecting device 72. The signal passage permitting device 71 receives a crank angle CRK that is output from the crank angle sensor 17 (FIG. 1). The signal passage permitting device 71 determines whether or not the crank angle CRK is in a predetermined range (from Dpw2s to Dpw2e). As shown in the equation (12), the permitting device 71 permits the passage of the second signal Pw2 to the in-cylinder pressure peak detecting device 72 when the crank angle CRK is within the predetermined range. The value of the second signal Pw2 is set in Pw2_tp. The permitting device 71 inhibits the passage of the second signal Pw2 to the in-cylinder pressure peak detecting device 72 when the crank angle CRK is not within the predetermined range.

CRK>Dpw2s and CRK<Dpw2e⇒Pw2_tp=Pw2

CRK<Dpw2s or CRK>Dpw2e⇒Pw2_tp=0 (12)

The predetermined range is set to include a crank angle at which the peak of the in-cylinder pressure occurs. Typically, because the peak of the in-cylinder pressure occurs when the engine piston reaches a top dead center (TDC), the range is predetermined based on the TDC. For example, the range is set to be from 5 degrees before the TDC to 10 degrees after the TDC.

The in-cylinder pressure peak detecting device 72 detects the peak of the in-cylinder pressure based on the signal Pw2_tp in a similar way to the first embodiment. That is, as shown in the equation (13), when the signal Pw2_tp having a value equal to or greater than a predetermined value SHpmax appears, the detecting device 72 determines that the peak of the in-cylinder pressure has been detected and sets a peak flag F_Pmax to a value of 1. If the signal Pw2_tp having a value equal to or greater than the predetermined value SHpmax does not appear, the value of the peak flag F_Pmax is kept at 0.

$$Pw2\_tp \geq SHpmax \Rightarrow F\_Pmax=1$$

$$Pw2\_tp < SHp\,max \Rightarrow F\_Pmax=0 \qquad (13)$$

A knocking detection period setting device 73 is the same as the knocking detection period setting device 62 of the first embodiment. That is, the knocking detection period setting device 73 sets the gate signal F_GATE to a value of 1 in response to setting the peak flag F_Pmax to a value of 1 and then starts measuring a time period Cgate. During the time period Cgate, the gate signal F_GATE is kept at the value of 1. The period during which the gate signal F_GATE is kept at the value of 1 is the knocking detection period.

Referring to FIG. 10(b), operation of the knock gate determining device in accordance with the second embodiment will be specifically described. It is seen that the second signal Pw2 appears in the signal Pw2_tp during the period permitted by the signal passage permitting device 71. Because the second signal Pw2 having a value equal to or greater than the predetermined value SHpmax is obtained at time t1, a value of 1 is set in the peak flag F_Pmax. In response to setting the value of 1 in the peak flag F_Pmax, the gate signal F_GATE is kept at a value of 1 during the time period Cgate (t1 to t2).

Third Embodiment of Knock gate Determining Device

Figure 11:
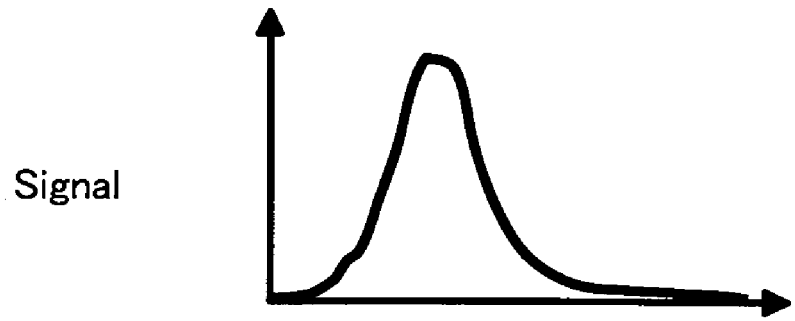
FIG. 11 schematically shows a second-order differential of a signal.
Figure 11:
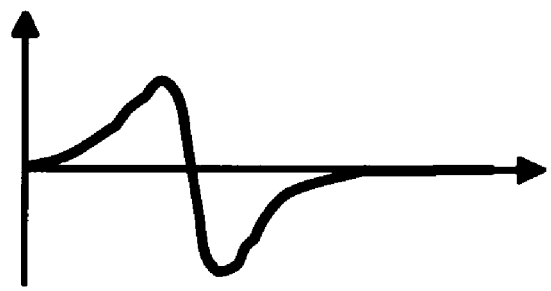
Figure 11:
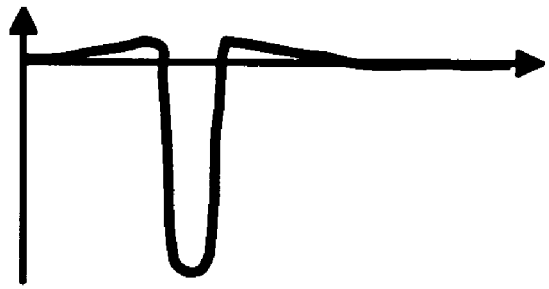

FIG. 11(a) shows an example of a signal. FIG. 11(b) shows a signal obtained by differentiating the signal of FIG. 11(a). FIG. 11(c) shows a signal obtained by further differentiating the signal of FIG. 11(b). That is, the signal of FIG. 11(c) is the second order differential of the signal of FIG. 11(a). Thus, through the second-order differential operation upon a signal, the edge of the signal (where the signal change is steep) can be enhanced. In this embodiment, such technique for enhancing the edge of a signal through the second-order differential operation is used to detect the peak of the in-cylinder pressure.

Figure 12:
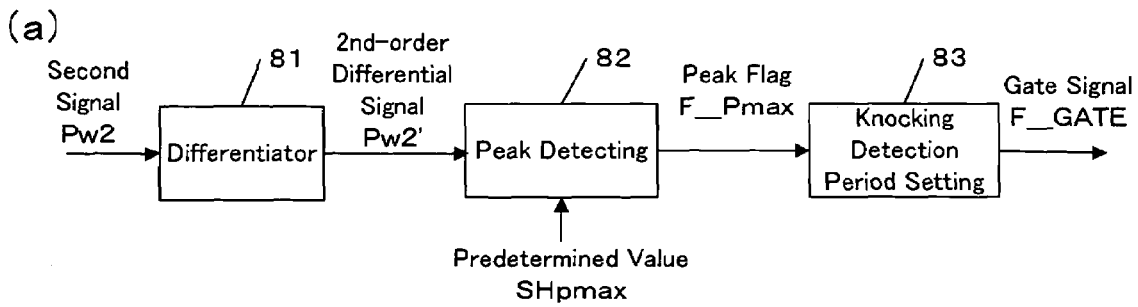
FIG. 12 is a block diagram of a knocking detection period setting device and shows how to set a knocking detection period in accordance with a third embodiment of the present invention.
Figure 12:
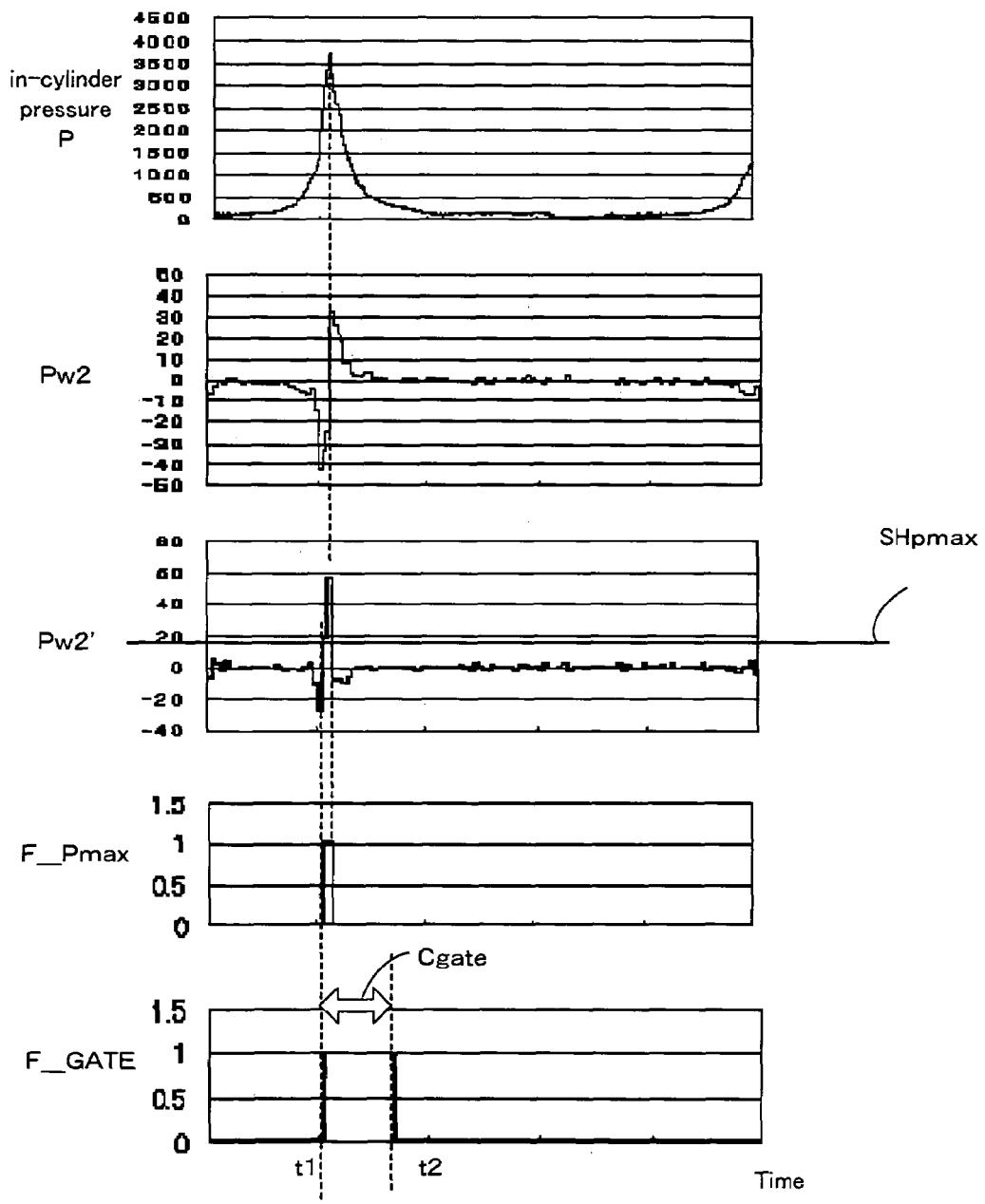

FIG. 12(a) is a block diagram of the knock gate determining device 43 in accordance with the third embodiment. A differentiator 81 receives the output signal $P_{L4}$ of the fourth low-frequency sub-band filter of the wavelet transformer 42 as the second signal Pw2. As shown in FIG. 7, the frequency band of this second signal Pw2 is 0 to 1.2 kHz.

As described above, the frequency band of the in-cylinder pressure is 0 to 600 Hz. According to the third embodiment, a signal that has this frequency band and is different from the knocking frequency band (equal to or greater than 8 kHz in this embodiment) can be used as the second signal Pw2. Although the frequency band of 0 to 1.2 kHz is selected in this embodiment, the frequency band of 0 to 600 Hz may be alternatively used. However, by using the frequency band of 0 to 1.2 kHz, the number of stages of the wavelet transformer 42 can be reduced as shown in FIG. 7.

According to the third embodiment, because the frequency band containing frequency components of the in-cylinder pressure can be selected to extract the second signal, freedom of selecting the frequency band is increased compared with the first and second embodiments that need to select the frequency band from which only the impulse signal can be extracted.

The differentiator 81 differentiates the second signal Pw2 to calculate a signal Pw2' as shown in the equation (14). In this embodiment, because the second signal Pw2 is generated based on the in-cylinder pressure change signal dP that is the first-order differential signal of the in-cylinder pressure signal P, the signal Pw2' is the second-order differential signal of the in-cylinder pressure signal P.

$$Pw2'=d(Pw2)/dt \qquad (14)$$

An in-cylinder pressure peak detecting device 82 compares the second-order differential signal Pw2' with a predetermined value SHpmax. As shown in the equation (15), if the second-order differential signal Pw2' having a value equal to or greater than the predetermined value SHpmax appears, the detecting device 82 determines that the peak of the in-cylinder pressure has been detected and sets a peak flag F_Pmax to a value of 1. The value of the peak flag F_Pmax is kept at 0 if the second-order differential signal Pw2' having a value equal to or greater than the predetermined value SHpmax does not appear.

$$Pw2' \geq SHp\,max \Rightarrow F\_P\,max=1$$

$$Pw2' < SHp\,max \Rightarrow F\_P\,max=0 \qquad (15)$$

A knocking detection period setting device 83 is the same as the knocking detection section setting device 62 of the first embodiment. That is, the knocking detection period setting device 83 sets the gate signal F_GATE to a value of 1 in response to setting the peak flag F_Pmax to a value of 1 and then starts measuring a time period Cgate. During the time period Cgate, the gate signal F_GATE is kept at the value of 1. The period during which the gate signal F_GATE is kept at the value of 1 is the knocking detection period.

Referring to FIG. 12(b), operation of the knock gate determining device in accordance with the third embodiment will be specifically described. It should be noted that the in-cylinder pressure signal P is not actually used by the knock gate determining device 43. The signal P is shown in the figure for the purpose of indicating a time at which the peak of the in-cylinder pressure occurs.

It is seen that the second-order differential signal Pw2' abruptly changes in response to the peak of the in-cylinder pressure at time t1. Because the second-order differential signal Pw2' having a value equal to or greater than the predetermined value SHpmax is obtained at t1, a value of 1 is set in the peak flag F_Pmax. In response to setting the value of 1 in the peak flag F_Pmax, the gate signal F_GATE is kept at a value of 1 during the time period Cgate (from t1 to t2). Thus, because the knocking detection period is established based on the peak of the in-cylinder pressure, it can be avoided that the seating noise is included in the knocking detection period. The knocking detection period can be established in accordance with combustion conditions of the engine in each combustion cycle. Even when timing of knocking occurrence varies, the knocking can be more accurately detected because the knocking detection period is appropriately established.

As described above, the in-cylinder pressure signal P can be used for the frequency analysis instead of the in-cylinder pressure change signal dP. When the frequency analysis by the wavelet transformer 42 is applied to the in-cylinder pressure signal P, the differentiator 81 performs the second-order differential operation upon the signal generated by the fourth low-frequency sub-band filter to calculate the second-order differential signal Pw2'.

Fourth Embodiment of Knock Gate Determining Device

Figure 13:
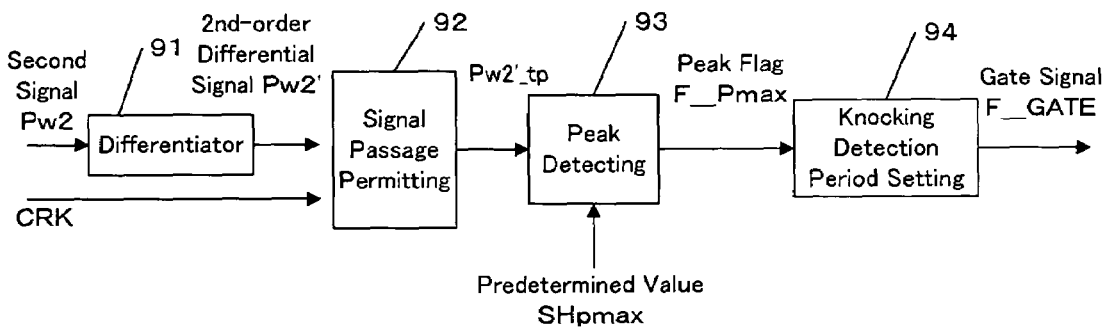
FIG. 13 is a block diagram of a knocking detection period setting device and shows how to set a knocking detection period in accordance with a fourth embodiment of the present invention.
Figure 13:
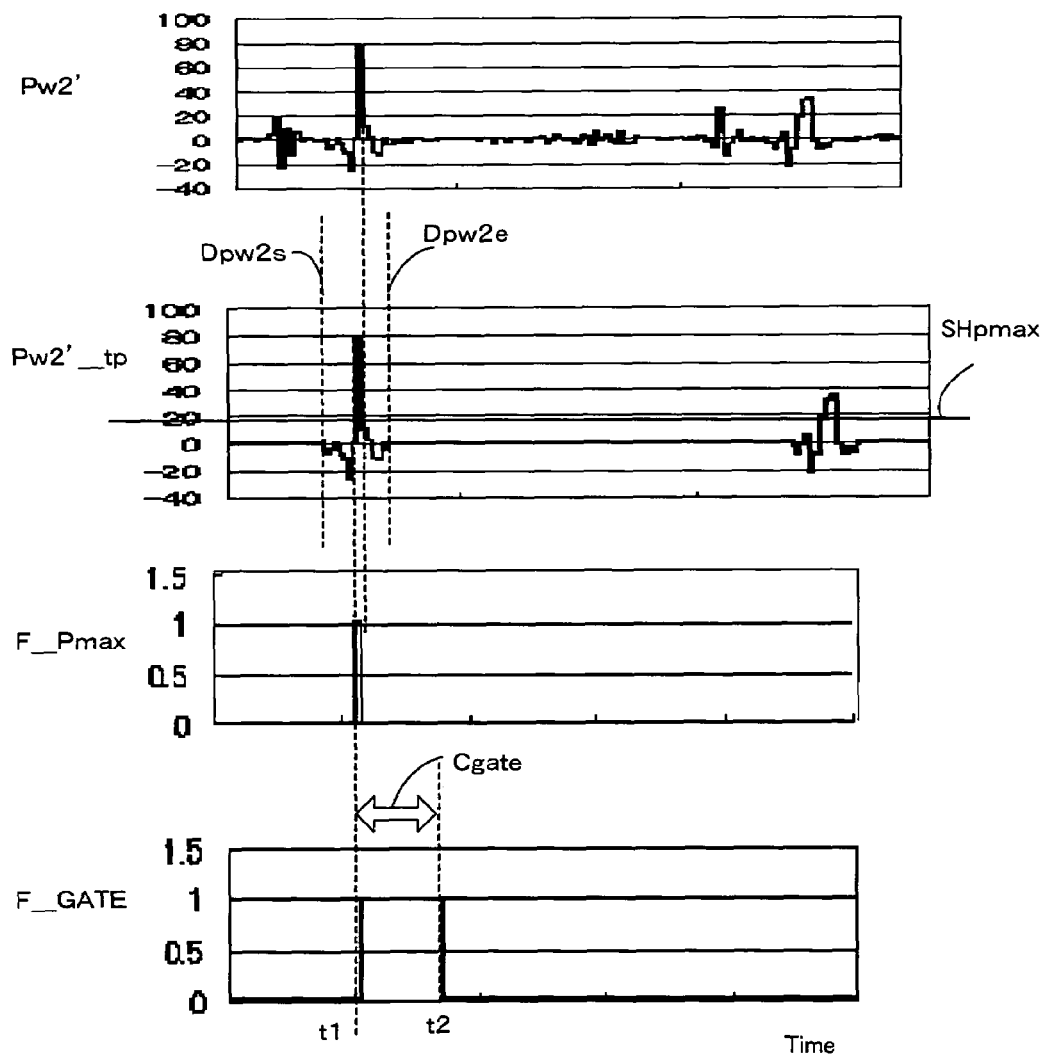

FIG. 13(a) is a block diagram of the knock gate determining device 43 in accordance with the fourth embodiment. A difference from the third embodiment is in that a signal passage permitting device 92 is provided between a differentiator 91 and an in-cylinder pressure peak detecting device 93. The signal passage permitting device 92 operates in a similar way to the signal passage permitting device 71 in accordance with the second embodiment.

The differentiator 91, which is the same as the differentiator 81 of the third embodiment, receives the output signal $P_{L4}$ of the fourth low-frequency sub-band filter of the wavelet transformer 42 as the second signal Pw2 to generate the second-order differential signal Pw2'.

The signal passage permitting device 92 receives a crank angle CRK that is output from the crank angle sensor 17 (FIG. 1) to determine whether or not the crank angle CRK is in a predetermined range (from Dpw2s to Dpw2e). The predetermined range is set in a similar way to the signal passage permitting device 71 in the second embodiment.

As shown in the equation (16), the permitting device 92 permits the passage of the second-order differential signal Pw2' to the in-cylinder pressure peak detecting device 93 when the crank angle CRK is within the predetermined range. The value of the second-order differential signal Pw2' is set in Pw2'_tp. The permitting device 92 inhibits the passage of the second-differential signal Pw2' to the in-cylinder pressure peak detecting device 93 when the crank angle CRK is not within the predetermined range. Pw2'_tp is set to zero.

$$CRK > Dpw2s \text{ and } CRK < Dpw2e \Rightarrow Pw2'\_tp = Pw2'$$

$$CRK < Dpw2s \text{ or } CRK > Dpw2e \Rightarrow Pw2'\_tp = 0 \quad (16)$$

An in-cylinder pressure peak detecting device 93 and a knocking detection period setting device 94 operates in a similar way to the third embodiment. Specifically, as shown in the equation (17), the in-cylinder pressure peak detecting device 93 compares the signal Pw2'_tp with a predetermined value SHpmax every time the signal Pw2'_tp is obtained. If the signal Pw2'_tp having a value equal to or greater than the predetermined value SHpmax is obtained, the peak detecting device 93 determines that the peak of the in-cylinder pressure has been detected and sets a value of 1 in a peak flag F_Pmax. The value of the peak flag F_Pmax is kept at zero if the signal Pw2'_tp having a value equal to or greater than the predetermined value SHpmax does not appear.

$$Pw2'\_tp \geq SHP \max \Rightarrow F\_P \max = 1$$

$$Pw2'\_tp < SHP \max \Rightarrow F\_P \max = 0 \quad (17)$$

The knocking detection period setting device 94 sets the gate signal F_GATE to a value of 1 in response to setting the peak flag F_Pmax to a value of 1 and then starts measuring a time period Cgate. During the time period Cgate (from t1 to t2), the gate signal F_GATE is kept at the value of 1. The period during which the gate signal F_GATE is kept at the value of 1 is the knocking detection period.

Referring to FIG. 13(b), operation of the knock gate determining device in accordance with the fourth embodiment will be specifically described. It is seen that the second-order differential signal Pw2' appears in the signal Pw2'_tp during the period permitted by the signal passage permitting device 92. Because the second signal Pw2'_tp having a value equal to or greater than the predetermined value SHpmax is obtained at time t1, a value of 1 is set in the peak flag F_Pmax. In response to setting the value of 1 in the peak flag F_Pmax, the gate signal F_GATE is kept at a value of 1 during the time period Cgate (time t1 to t2).

Now, a process for detecting knocking will be described referring to FIGS. 14 through 19. This process can be typically implemented by the functional blocks shown in FIG. 4. Establishing the knocking detection period is based on a process performed by the knock gate determining device 43 in accordance with the above second embodiment. Accordingly, a wavelet transform is based on a process performed by the wavelet transformer 42 shown in FIG. 5. However, those skilled in the art would understand that this process can be modified to be applicable to the knock gate determining device 43 in accordance with any of the first, third and fourth embodiments.

Figure 14:
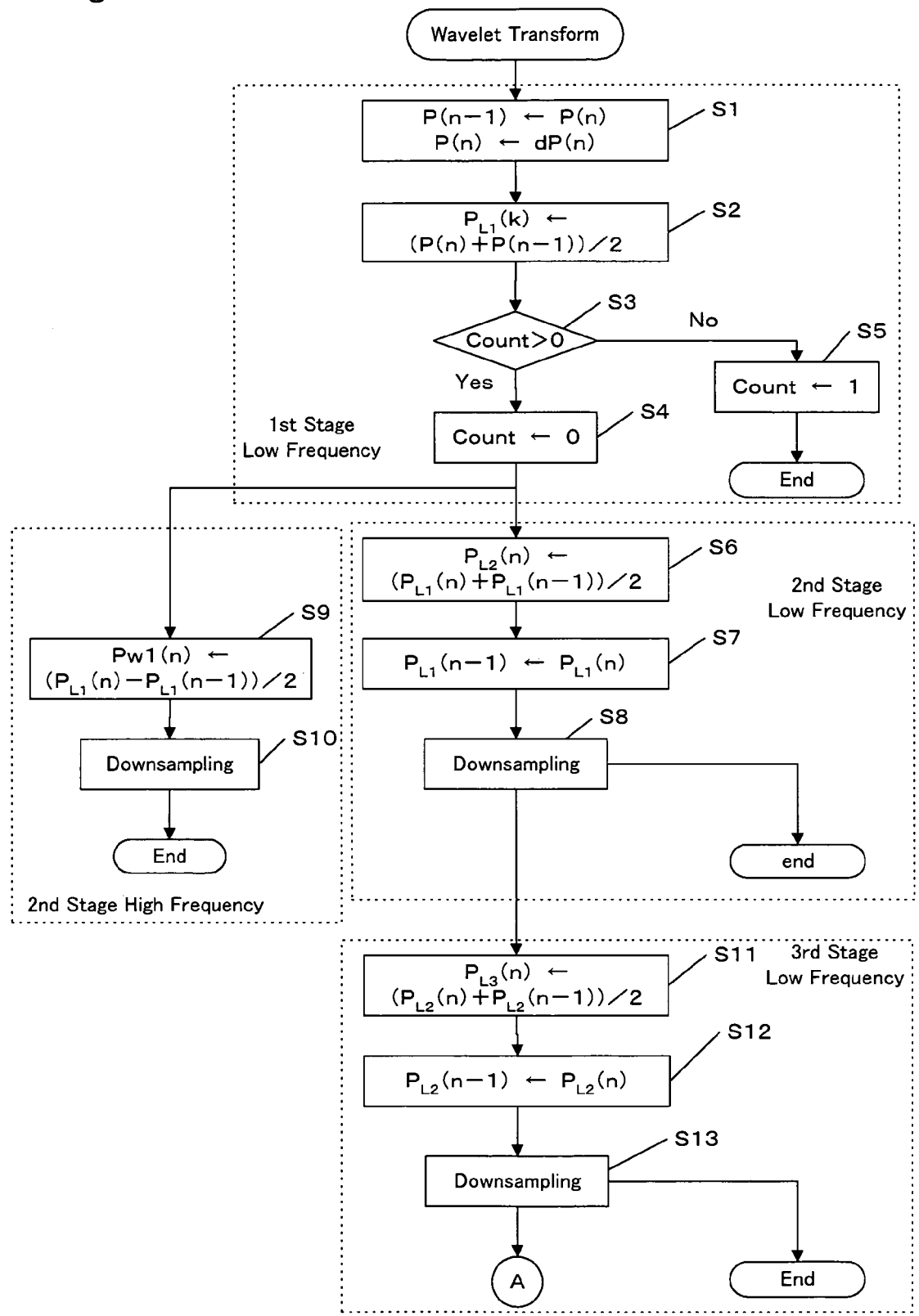
FIGS. 14 and 15 are a flowchart of a wavelet transform process in accordance with one embodiment of the present invention.
Figure 15:
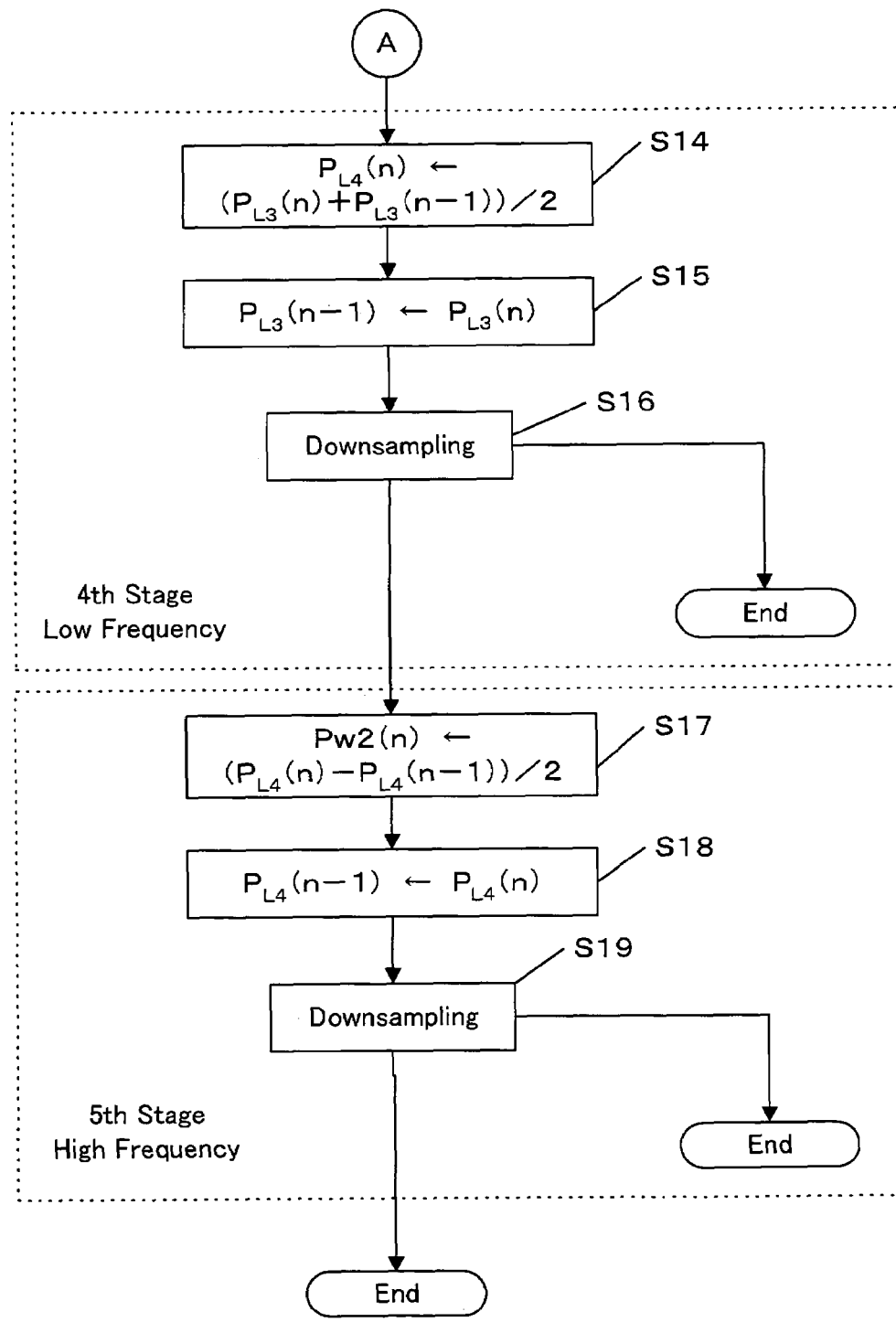

FIGS. 14 and 15 show a flowchart of the wavelet transform process. This process is performed every time the output of the in-cylinder pressure sensor is sampled.

Steps S1 through S5 show a process of the first low-frequency sub-band filter. In step S1, a shift process is performed so as to receive the current value dP(n) of the output signal of the in-cylinder pressure sensor. The process in step S1 enables the current value dP(n) of the output signal of the in-cylinder pressure sensor to be stored in P(n) and the previous value to be stored in P(n−1).

In step S2, the output $P_{L1}(n)$ of the first low-frequency sub-band filter is calculated in accordance with the above equation (5). A down-sampling process is performed in steps S3 to S5. A counter Count is set. If the value of Count is zero, the value of Count is incremented (S5) and then this process terminates. If the value of Count is 1, the value of Count is reset in step S4. The output $P_{L1}(n)$ of this filter is passed to the second stage of the wavelet.

Steps S6 through S8 show a process of the second low-frequency sub-band filter. In step S6, the current value $P_{L1}(n)$ and the previous value $P_{L1}(n-1)$ received from the first stage are used to generate the output signal $P_{L2}(n)$ of the second low-frequency sub-band filter in a similar way to the equation (5). In step S7, a shift process is performed upon the value $P_{L1}$ received from the first stage. In step S8, a down-sampling process similar to steps S3 to S5 is performed, a detail of which is omitted for the purpose of simplicity.

Steps S9 to S10 show a process of the second high-frequency sub-band filter. The current value $P_{L1}(n)$ and the previous value $P_{L1}(n-1)$ received from the first stage are used to generate the output signal of the second high-frequency sub-band filter, that is, the first signal Pw1(n), in a similar way to the equation (4). In step S10, a down-sampling (similar to steps S3 through S5) is performed.

Steps S11 through S13 show a process of the third low-frequency sub-band filter. This is performed in a similar way to the process in steps S6 through S8 by the second low-frequency sub-band filter.

Referring to FIG. 15, steps S14 through S16 show a process of the fourth low-frequency sub-band filter. This is performed in a similar way to the process in steps S6 through S8 by the second low-frequency sub-band filter. Steps S17 through S19 show a process of the fifth low-frequency sub-band filter. This is performed in a similar way to the process in steps S6 through S8 by the second low-frequency sub-band filter. Thus, the second signal Pw2 is generated.

Figure 16:
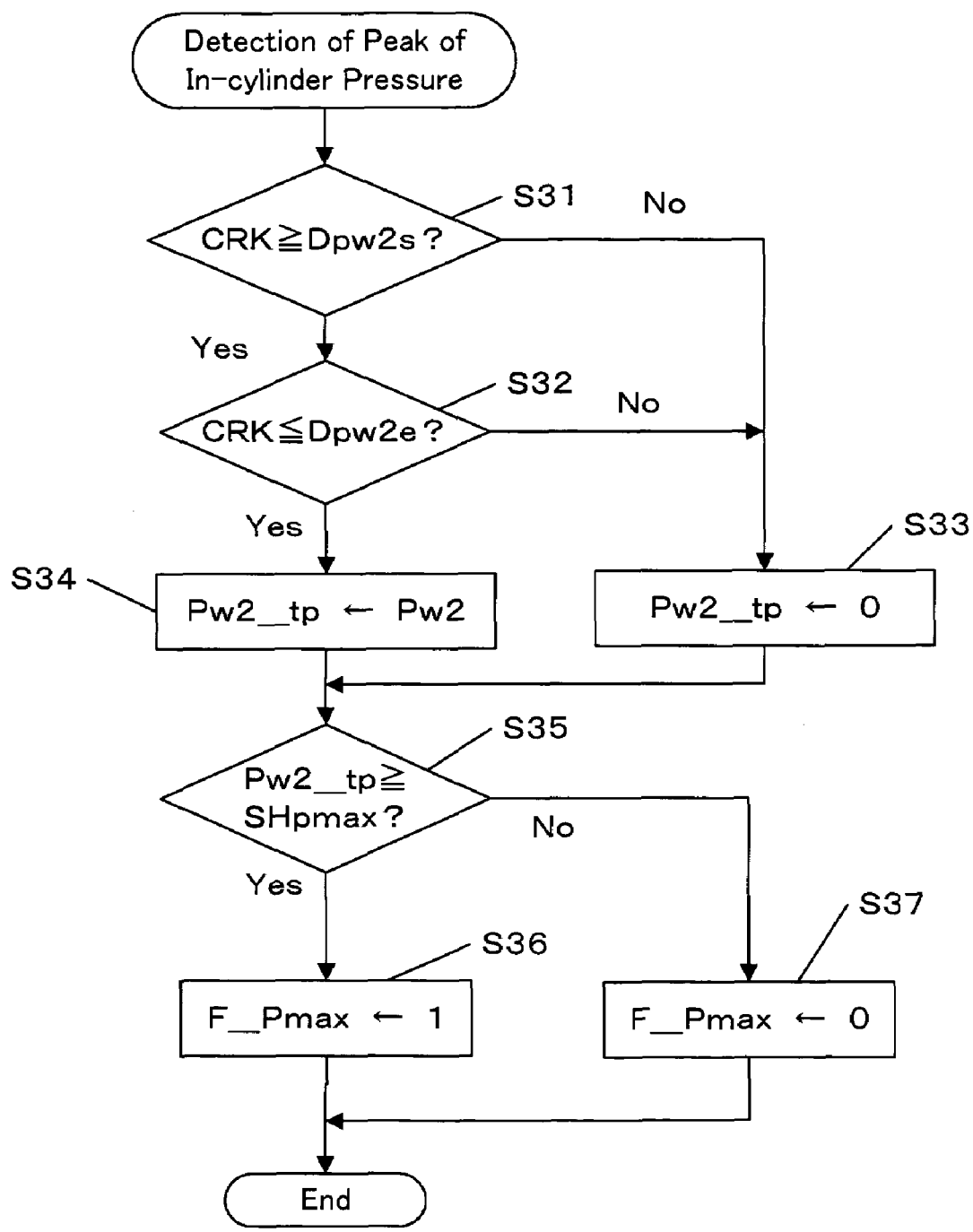
FIG. 16 is a flowchart of a process for detecting a peak of the in-cylinder pressure in accordance with one embodiment of the present invention.

FIG. 16 shows a process for detecting a peak of the in-cylinder pressure. This process is performed every time the second signal Pw2 is generated in step S17 of the wavelet transform process. For example, when the sampling frequency Fs is 36 kHz, the second signal Pw2 is generated at a frequency of 1.2 kHz. That is, this process is performed at a frequency of 1.2 kHz. It should be noted that the frequency of 1.2 k Hz is only one example because the frequency of the output signal in each stage of the wavelet transform changes in accordance with the sampling frequency Fs as described above.

In steps S31 and S32, it is examined whether the current crank angle CRK detected by the crank angle sensor is within a predetermined range from Dpw2s to Dpw2e. If the crank angle CRK is not within the predetermined range, the signal Pw2_tp is set to zero in step S33. If the crank angle CRK is within the predetermined range, the signal Pw2_tp is set to Pw2 calculated in step S17 (S34).

In step S35, the signal Pw2_tp is compared with a predetermined value SHpmax. If the signal Pw2_tp is equal to or greater than the predetermined value SHpmax, it indicates that a peak of the in-cylinder pressure has been detected. The peak flag F_Pmax is set to a value of 1 (S36). If the signal Pw2_tp is less than the predetermined value SHpmax, it indicates that a peak of the in-cylinder pressure has not been detected. The peak flag F_Pmax is set to a value of zero (S37).

Figure 17:
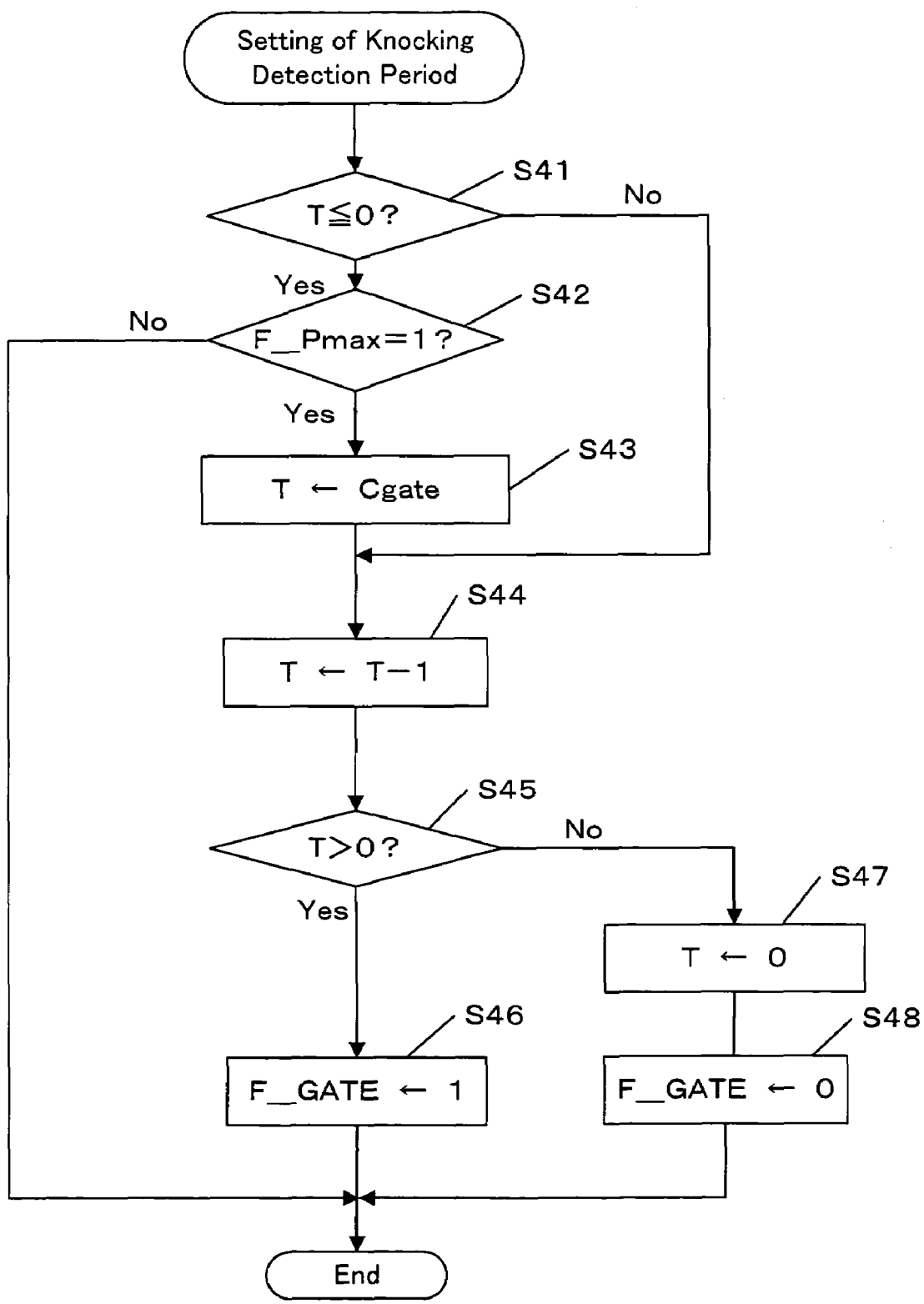
FIG. 17 is a flowchart of a process for setting a knocking detection period in accordance with one embodiment of the present invention.

FIG. 17 shows a process for establishing a knocking detection period. This process is performed at a timing at which the output of the in-cylinder pressure sensor is sampled. For example, when the sampling frequency Fs is 36 kHz, this process is performed at a frequency of 36 kHz.

In step S41, the value T of a timer that measures a duration of the knocking detection period is examined. If T is zero, the process proceeds to step S42. If T is not zero, the process proceeds to step S44.

In step S42, the value of the peak flag F_Pmax is examined. If the value of the peak flag F_Pmax is 1, it indicates that the peak of the in-cylinder pressure has been detected. The timer value T is set to a time period Cgate (S43).

Steps S44 and S45 are a process for updating the value T of the timer. In step S44, the value T of the timer is decremented by one. If the value T of the timer has not reached zero in step S45, the value of the gate signal F_GATE is kept at 1, and hence the knocking detection period continues (S46).

If the value T of the timer is equal to or less than zero in step S45, it indicates that the time period Cgate has elapsed. In step S47, the value of the timer T is reset to zero. In step S48, the value of the gate signal F_GATE is set to zero. Then, the knocking detection period terminates.

Figure 18:
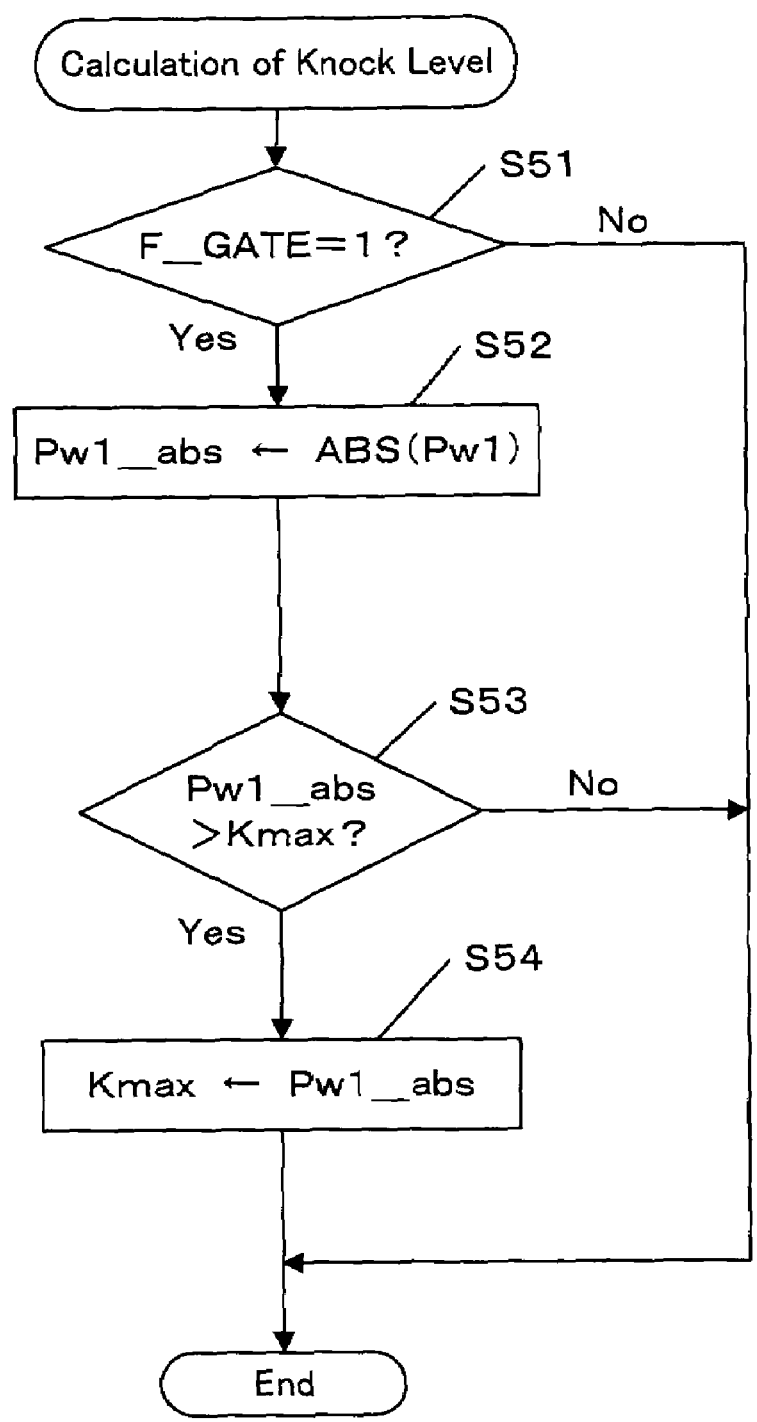
FIG. 18 is a flowchart of a process for determining a knock level in accordance with one embodiment of the present invention.

FIG. 18 shows a process for determining a knock level. This process is performed every time the first signal Pw1 is calculated in step S9 of the wavelet transform process. For example, when the sampling frequency Fs is 36 kHz, the first signal Pw1 is generated at a frequency of 9 kHz. Therefore, the process is also performed at a frequency of 9 kHz. As described above, it should be noted that the frequency of 9 kHz is only one example because the frequency of the output signal in each stage of the wavelet transform changes in accordance with the sampling frequency Fs.

In step S51, the value of the gate signal F_GATE is examined. If the value of the gate signal F_GATE is zero, it is outside the knocking detection period, so this process terminates. If the value of the gate signal F_GATE is 1, it is inside the knocking detection period.

In step S52, an absolute value function is applied to the first signal Pw1 to calculate an absolute value Pw1_abs of the first signal.

Steps S53 and S54 show a process for determining a peak value Kmax of the absolute value Pw1_abs of the first signal. An initial value of Kmax is zero. If the absolute value Pw1_abs is greater than the current peak value Kmax in step S53, the peak value Kmax is updated with the absolute value Pw1_abs (S54). If the absolute value Pw1_abs is equal to or less than the current peak value Kmax in step S53, the process terminates without updating the peak value Kmax.

Figure 19:
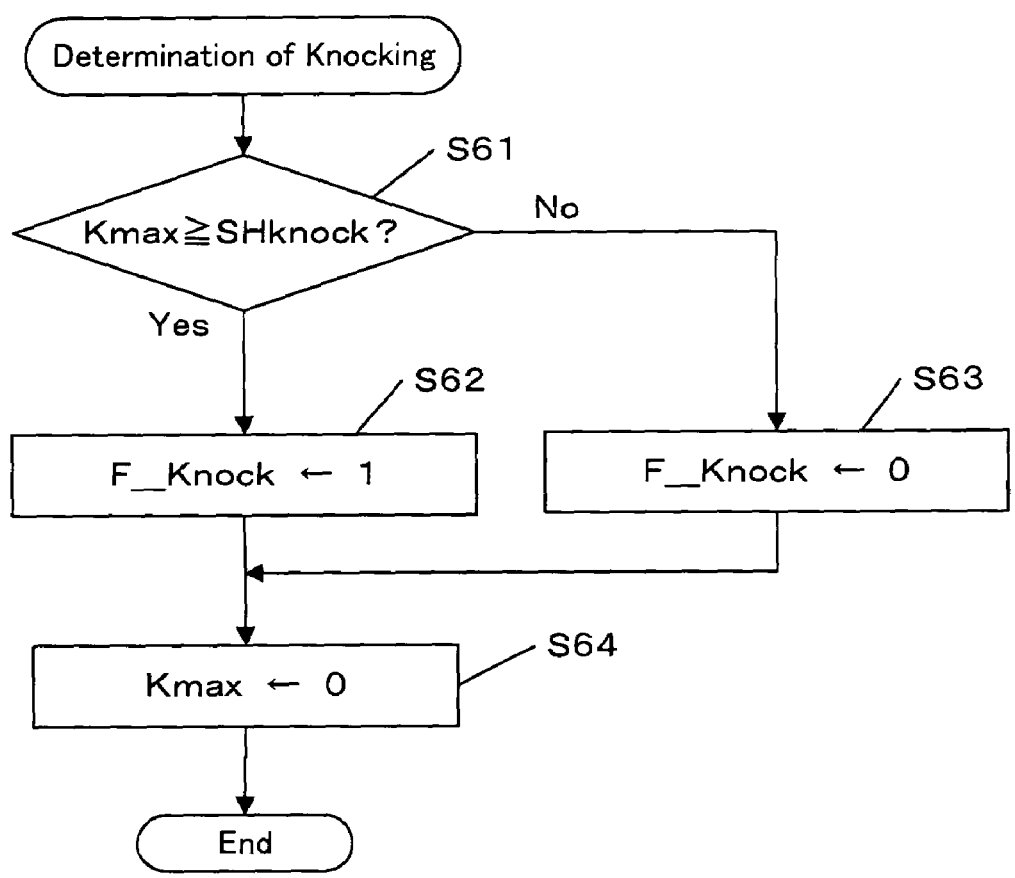
FIG. 19 is a flowchart of a process for calculating a knocking occurrence in accordance with one embodiment of the present invention.
Figure 20:
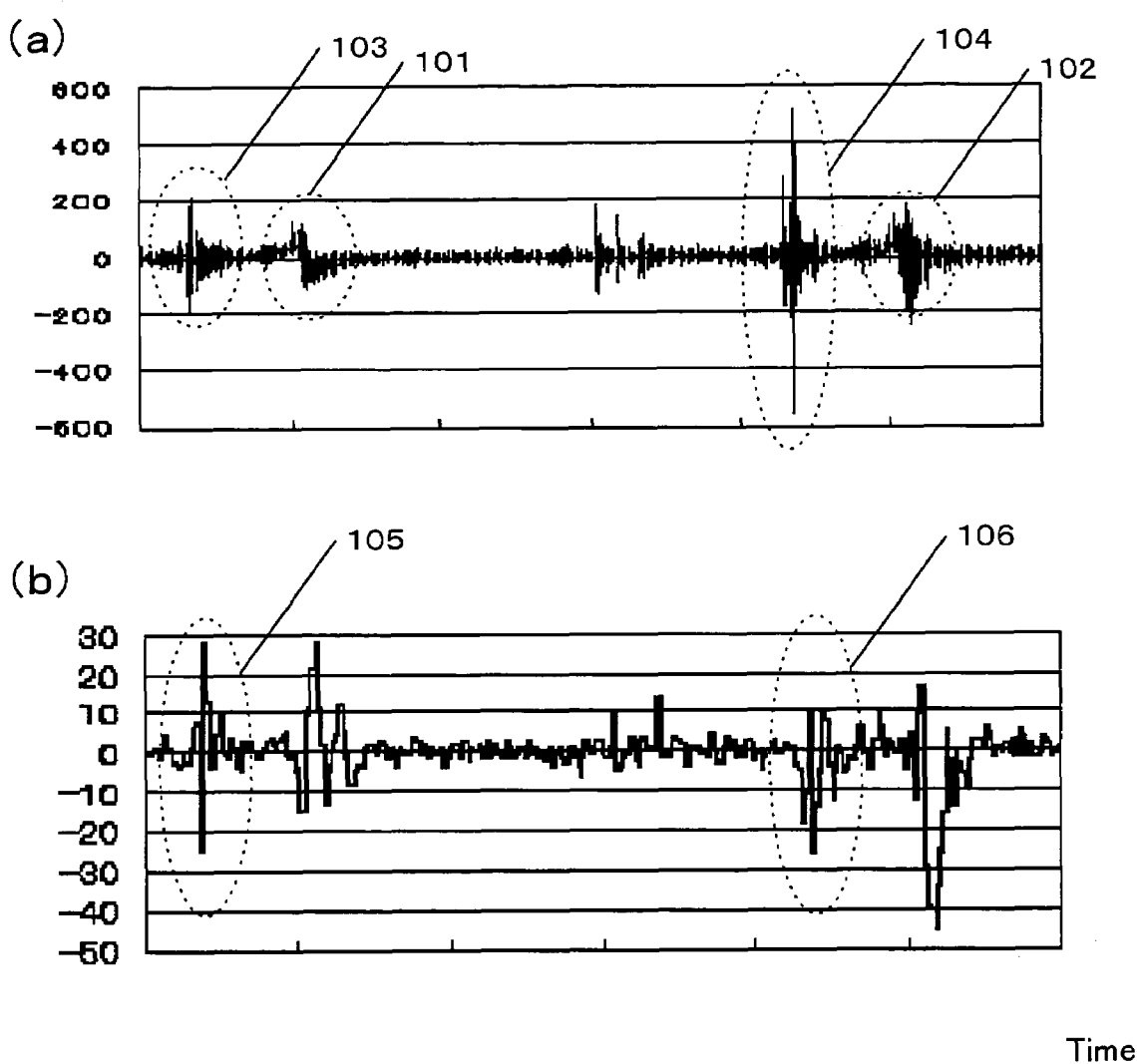
FIG. 20(a) shows an output signal of a vibration sensor and FIG. 20(b) shows a signal obtained by applying a wavelet transform to the output signal of FIG. 20(a), in accordance with a conventional technique.

FIG. 19 shows a process for determining a knocking occurrence. This process is performed one time per each combustion cycle.

In step S61, the peak value Kmax calculated in step S54 is compared with a predetermined value SHknock. If the peak value Kmax is equal to or greater than the predetermined value SHknock, it is determined that knocking has occurred. The knock flag F_Knock is set to a value of 1 (S62). If the peak value Kmax is less than the predetermined value SHknock, it is determined that knocking has not occurred. The knock flag F_Knock is set to zero (S63). In step S64, the peak value Kmax is reset to zero in preparation for a process in the next combustion cycle.

The present invention can be applied to a general-purpose engine (for example, an outboard motor).

What is claimed is:

1. An apparatus for detecting knocking of an engine, comprising:
   an in-cylinder pressure sensor for outputting a signal corresponding to an internal cylinder pressure of the engine;
   a signal extracting device for extracting a first signal and a second signal from the output signal of the in-cylinder pressure sensor, the first signal having a frequency band corresponding to knocking of the engine, the second signal having a frequency band for detecting a peak of the internal cylinder pressure;
   a knocking detection period setting device for setting a knocking detection period based on the second signal; and
   a knocking determining device for examining the first signal in the knocking detection period to determine whether knocking has occurred.

2. The apparatus of claim 1, wherein the knocking determining device determines that knocking has occurred if a peak of the first signal exceeds a predetermined value in the knocking detection period.

3. The apparatus of claim 1, wherein the knocking determining device determines that knocking has occurred if a value obtained by statistically processing the first signal exceeds a predetermined value in the knocking detection period.

4. The apparatus of claim 1, wherein the output signal of the in-cylinder pressure sensor indicates a differential of the internal cylinder pressure of the engine.

5. The apparatus of claim 1, wherein the second signal has a frequency band in which an impulse signal appears when the internal pressure reaches the peak,
   wherein the knocking detection period setting device further includes:

a peak detecting device for detecting the impulse signal indicating an occurrence of the peak of the internal pressure by comparing the second signal with a predetermined value; and a device for setting the knocking detection period over a predetermined period from a time at which the impulse signal is detected.

6. The apparatus of claim 5, wherein the knocking detection period setting device further includes a signal passage permitting device upstream of the peak detecting device, wherein the signal passage permitting device determines whether a crank angle signal detected for the engine is within a predetermined range, permits the passage of the second signal to the peak detecting device if the crank angle signal is within the predetermined range, and inhibits the passage of the second signal to the peak detecting device if the crank angle signal is not within the predetermined range.

7. The apparatus of claim 1, wherein the second signal has a frequency band that includes frequency components of the internal cylinder pressure, wherein the knocking detection period setting device further includes:

a differentiator for calculating a second-order differential signal of the internal cylinder pressure;

a peak detecting device for detecting a peak of the internal cylinder pressure by comparing the second-order differential signal with a predetermined value; and a device for setting the knocking detection period over a predetermined period from a time at which the peak of the internal cylinder pressure is detected.

8. The apparatus of claim 7, wherein the knocking detection period setting device further includes a signal passage permitting device between the differentiator and the peak detecting device, wherein the signal passage permitting device determines whether a crank angle signal detected for the engine is within a predetermined range, permits the passage of the second-order differential signal to the peak detecting device if the crank angle signal is within the predetermined range, and inhibits the passage of the second-order differential signal to the peak detecting device if the crank angle signal is not within the predetermined range.

9. A method for detecting knocking of an engine, comprising:

acquiring an output signal from an in-cylinder pressure sensor, the output signal corresponding to an internal cylinder pressure of the engine;

extracting a first signal and a second signal from the output signal of the in-cylinder pressure sensor, the first signal having a frequency band corresponding to knocking of the engine, the second signal having a frequency band for detecting a peak of the internal cylinder pressure;

setting a knocking detection period based on the second signal; and examining the first signal in the knocking detection period to determine whether knocking has occurred.

10. The method of claim 9, further comprising:

determining that knocking has occurred if a peak of the first signal exceeds a predetermined value in the knocking detection period.

11. The method of claim 9, further comprising:

determining that knocking has occurred if a value obtained by statistically processing the first signal exceeds a predetermined value in the knocking detection period.

12. The method of claim 9, wherein the output signal of the in-cylinder pressure sensor indicates a differential of the internal cylinder pressure of the engine.

13. The method of claim 9, wherein the second signal has a frequency band in which an impulse signal appears when the internal pressure reaches the peak, wherein the step of setting the knocking detection period further includes:

detecting the impulse signal indicating an occurrence of the peak of the internal pressure by comparing the second signal with a predetermined value; and setting the knocking detection period over a predetermined period from a time at which the impulse signal is detected.

14. The method of claim 13, further comprising:

determining whether a crank angle signal detected for the engine is within a predetermined range;

enabling the detection of the peak of the internal cylinder pressure if the crank angle signal is within the predetermined range; and disabling the detection of the peak of the internal cylinder pressure if the crank angle signal is not within the predetermined range.

15. The method of claim 9, wherein the second signal has a frequency band that includes frequency components of the internal cylinder pressure, wherein the step of setting the knocking detection period further includes:

calculating a second-order differential signal of the internal cylinder pressure;

detecting a peak of the internal cylinder pressure by comparing the second-order differential signal with a predetermined value; and setting the knocking detection period over a predetermined period from a time at which the peak of the internal cylinder pressure is detected.

16. The method of claim 15, further comprising:

determining whether a crank angle signal detected for the engine is within a predetermined range;

enabling the detection of the peak of the internal cylinder pressure if the crank angle signal is within the predetermined range; and disabling the detection of the peak of the internal cylinder pressure if the crank angle signal is not within the predetermined range.

* * * * *